United States Patent
Takahashi et al.

(10) Patent No.: US 12,030,012 B2
(45) Date of Patent: Jul. 9, 2024

(54) SCRUBBER APPARATUS FOR GEOTHERMAL POWER GENERATION

(71) Applicant: FUJI ELECTRIC CO., LTD., Kanagawa (JP)

(72) Inventors: Kuniyuki Takahashi, Hino (JP); Taichiro Kato, Musashino (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 0 days.

(21) Appl. No.: 17/737,957

(22) Filed: May 5, 2022

(65) Prior Publication Data

US 2022/0370949 A1 Nov. 24, 2022

(30) Foreign Application Priority Data

May 18, 2021 (JP) .................................. 2021-083942

(51) Int. Cl.
*B01D 45/16* (2006.01)
*B01D 47/06* (2006.01)
*B01D 50/40* (2022.01)

(52) U.S. Cl.
CPC ............ *B01D 50/40* (2022.01); *B01D 45/16* (2013.01); *B01D 47/06* (2013.01)

(58) Field of Classification Search
CPC ........ B01D 50/40; B01D 45/16; B01D 47/06; B01D 45/02; Y02E 10/10
See application file for complete search history.

(56) References Cited

U.S. PATENT DOCUMENTS

| | | | | | |
|---|---|---|---|---|---|
| 3,844,745 | A | * | 10/1974 | Hausberg | C21C 5/40 266/155 |
| 3,907,526 | A | * | 9/1975 | Saleem | B01D 47/06 423/243.01 |
| 3,989,485 | A | * | 11/1976 | Kilian | B01D 50/00 95/219 |
| 4,008,056 | A | * | 2/1977 | Potter | B01D 47/06 261/126 |
| 4,053,292 | A | * | 10/1977 | Schneider | B01D 50/00 55/440 |

(Continued)

FOREIGN PATENT DOCUMENTS

| JP | S577528 A | 1/1982 |
|---|---|---|
| JP | S62288800 A | 12/1987 |

(Continued)

*Primary Examiner* — Dung H Bui

(57) ABSTRACT

Provided is a scrubber apparatus for geothermal power generation configured to treat gas from geothermal power generation equipment to supply a power generation apparatus with the treated gas. The scrubber apparatus for geothermal power generation comprises: a wet-type cyclone scrubber unit that has a reaction tower into which the gas is introduced and a liquid spray unit for spraying liquid into the reaction tower and that is configured to treat the gas with the liquid; a gas derivation unit connected to the wet-type cyclone scrubber unit and configured to derive the gas to the power generation apparatus; and a swirling unit that is arranged farther downstream than the liquid spray unit in a gas flow channel including the wet-type cyclone scrubber unit and the gas derivation unit and that is configured to swirl the gas in a predetermined swirling direction.

22 Claims, 21 Drawing Sheets

(56) References Cited

U.S. PATENT DOCUMENTS

| | | | | |
|---|---|---|---|---|
| 4,145,193 A * | 3/1979 | Hegemann | B01D 47/06 96/261 |
| 4,157,250 A * | 6/1979 | Regehr | B01D 45/16 55/443 |
| 4,204,847 A * | 5/1980 | Ko | B01D 45/08 55/440 |
| 4,375,976 A * | 3/1983 | Potter | B01D 50/10 95/200 |
| 5,176,723 A * | 1/1993 | Liu | B01D 47/10 95/216 |
| 5,201,919 A * | 4/1993 | Jahn | B01D 50/40 96/368 |
| 5,656,047 A * | 8/1997 | Odom | B01D 47/06 96/216 |
| 9,932,970 B1 * | 4/2018 | Jeter | F03G 6/045 |
| 10,987,621 B1 * | 4/2021 | Lee | B01D 53/79 |
| 2005/0011170 A1 * | 1/2005 | Christiansen | B04C 5/103 55/345 |
| 2007/0039608 A1 * | 2/2007 | Chang | B01D 50/40 126/301 |
| 2008/0134891 A1 * | 6/2008 | Jarvenpaa | B01D 47/14 95/205 |
| 2009/0183632 A1 * | 7/2009 | Peltonen | B01D 47/10 95/151 |
| 2013/0239810 A1 * | 9/2013 | Yang | B01D 53/14 95/196 |
| 2013/0247764 A1 * | 9/2013 | Kvamsdal | B01D 19/0057 96/208 |
| 2015/0059571 A1 * | 3/2015 | Denton | B01D 46/04 55/385.1 |
| 2015/0165364 A1 * | 6/2015 | Ollila | B01D 47/10 96/306 |
| 2016/0243487 A1 * | 8/2016 | Kim | A23F 5/04 |
| 2018/0126318 A1 * | 5/2018 | Schubert | B01D 47/027 |
| 2022/0032226 A1 * | 2/2022 | Tubergen | B01D 50/40 |
| 2022/0274044 A1 * | 9/2022 | Price | F04D 29/706 |

FOREIGN PATENT DOCUMENTS

| | | |
|---|---|---|
| JP | H01115428 A | 5/1989 |
| JP | H0383615 A | 4/1991 |
| JP | H07229325 A | 8/1995 |
| JP | H11207106 A | 8/1999 |
| JP | 3160792 U | 7/2010 |
| WO | 2014014002 A1 | 1/2014 |

\* cited by examiner

SCRUBBER APPARATUS FOR GEOTHERMAL POWER GENERATION

The contents of the following Japanese patent application are incorporated herein by reference:
NO. 2021-083942 filed in JP on May 18, 2021.

BACKGROUND

1. Technical Field

The present invention relates to a scrubber apparatus for geothermal power generation.

2. Related Art

In the prior art, a gas treatment apparatus has been known that treats gas from geothermal power generation equipment or the like (see Patent Documents 1 to 8, for example).
Patent Document 1: Japanese Patent Application Publication No. H7-229325
Patent Document 2: Utility Model Registration No. 3160792
Patent Document 3: Japanese Patent Application Publication No. S57-7528
Patent Document 4: WO 2014-014002
Patent Document 5: Japanese Patent Application Publication No. H11-207106
Patent Document 6: Japanese Patent Application Publication No. S62-288800
Patent Document 7: Japanese Patent Application Publication No. H1-115428
Patent Document 8: Japanese Patent Application Publication No. H3-83615

DESCRIPTION OF EXEMPLARY EMBODIMENTS

Hereinafter, the present invention will be described through embodiments of the invention, but the following embodiments do not limit the claimed invention. Moreover, not all combinations of features described in the embodiments are necessary to solutions of the invention.

Figure 1:
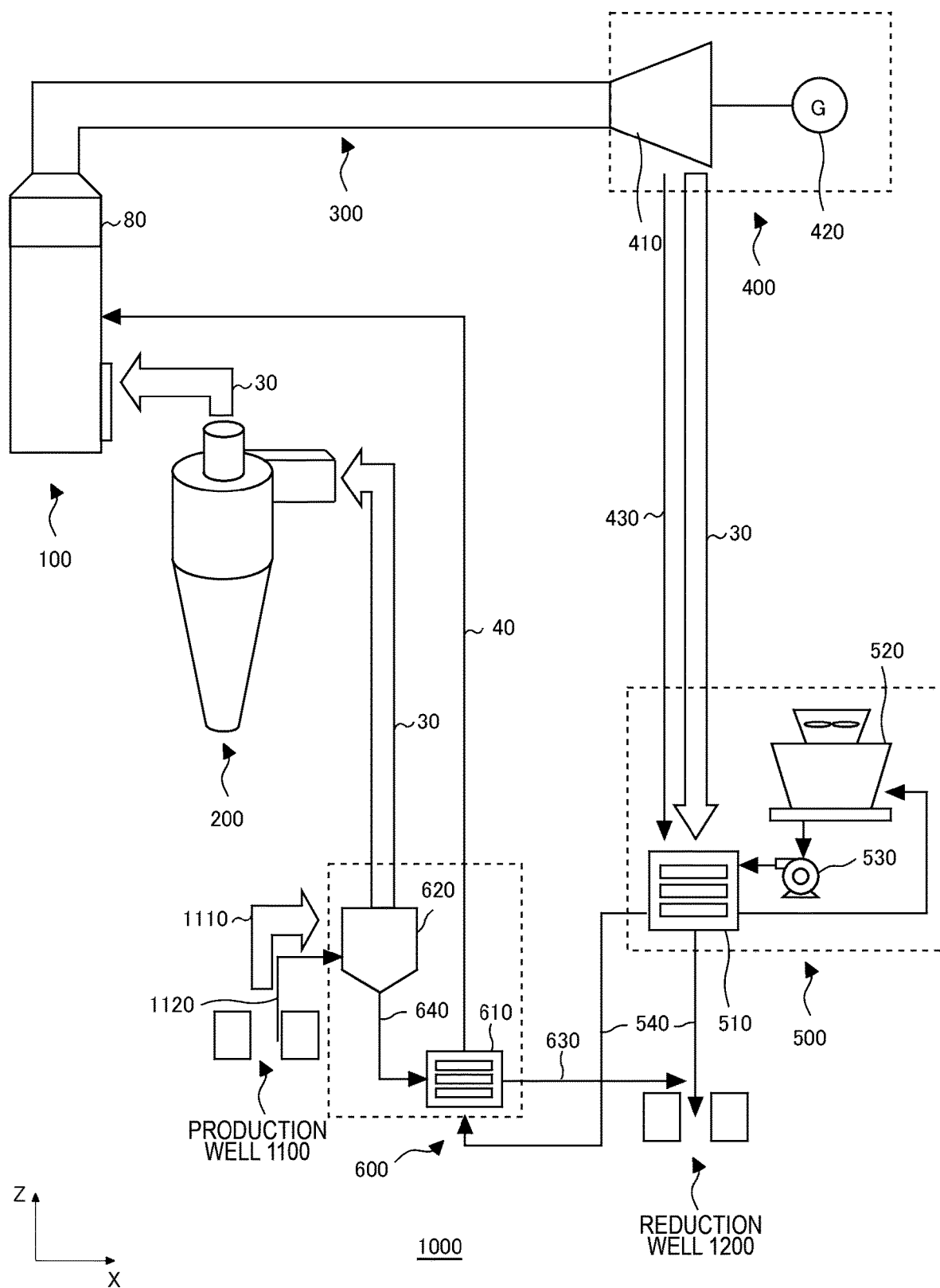
FIG. 1 shows an example of a scrubber apparatus for geothermal power generation 1000 according to one embodiment of the present invention.

FIG. 1 shows an example of a scrubber apparatus for geothermal power generation 1000 according to one embodiment of the present invention. The scrubber apparatus for geothermal power generation 1000 includes a wet-type cyclone scrubber unit 100, a dry-type cyclone scrubber unit 200, a gas derivation unit 300, a gas recovery unit 500, and an introduction unit 600.

The scrubber apparatus for geothermal power generation 1000 treats gas 30 from geothermal power generation equipment. The scrubber apparatus for geothermal power generation 1000 treats the gas 30 from the geothermal power generation equipment, to supply the gas 30 to a power generation apparatus 400. The gas 30 from the geothermal power generation equipment may be vapor from a production well 1100. The gas 30 from the geothermal power generation equipment may also be a mixture of vapor and hot liquid from the production well 1100. The production well 1100 pumps vapor and hot liquid from an underground geothermal reservoir. In FIG. 1, the vapor from the production well 1100 is defined as vapor 1110, and the hot liquid from the production well 1100 is defined as hot liquid 1120. The vapor 1110 from the production well 1100 contains particulate dusts such as earth and sand, silica, and sulfide. It is preferable to prevent failure of the power generation apparatus 400 by removing the particulate dusts.

The introduction unit 600 introduces the gas 30 containing the vapor 1110 from the production well 1100 into the dry-type cyclone scrubber unit 200. Moreover, the introduction unit 600 introduces liquid 40 into the wet-type cyclone scrubber unit 100. In this example, the introduction unit 600 has a heating tank 610 and a vapor-liquid separation unit 620.

The vapor-liquid separation unit 620 may conduct vapor-liquid separation of the vapor 1110 and the hot liquid 1120 from the production well 1100. In this example, the vapor-liquid separation unit 620 conducts the vapor-liquid separation of the vapor 1110 and the hot liquid 1120 from the production well 1100 into the gas 30 and liquid 640. The vapor-liquid separation unit 620 may introduce the gas 30 into the dry-type cyclone scrubber unit 200. The vapor-liquid separation unit 620 may introduce the liquid 640 into the heating tank 610. The vapor-liquid separation unit 620 may also introduce the liquid 640 into the heating tank 610 after adding a scale inhibitor to the liquid 640.

The heating tank 610 heats the liquid 40 to be introduced into the wet-type cyclone scrubber unit 100. The heating tank 610 may heat the liquid 40 by using the liquid 640. The heating tank 610 in this example heats liquid 540 by conducting heat exchange between the liquid 540 of a recovery tank 510 described later and the liquid 640. The heating tank 610 may introduce the liquid 40 obtained by heating the liquid 540 into the wet-type cyclone scrubber unit 100. The heating tank 610 outputs the liquid 640 used for the heat exchange as liquid 630 cooled. The heating tank 610 may return the liquid 630 to a reduction well 1200. The liquid 540 is liquid containing relatively few impurities such as scale. Therefore, introducing the liquid 40 obtained by heating the liquid 540 into the wet-type cyclone scrubber unit 100 can inhibit formation of scale in the wet-type cyclone scrubber unit 100 while reusing water resource. Scale refers to something formed by deposition followed by solidification, of impurities such as silica that had been contained in liquid. Moreover, using the liquid 640 for the heat exchange allows heat energy of the liquid 640 to be effectively utilized. Moreover, introducing the heated liquid 40 into the wet-type cyclone scrubber unit 100 can inhibit the gas 30 from being cooled by the liquid 40 in the wet-type cyclone scrubber unit 100. This can reduce an energy loss of the gas 30 introduced into the power generation apparatus 400.

The dry-type cyclone scrubber unit 200 may treat the gas 30. In this example, the dry-type cyclone scrubber unit 200 treats the gas 30 from the introduction unit 600. In the dry-type cyclone scrubber unit 200, a relatively large suspended matter can be removed among the particulate dusts in the gas 30. The suspended matter includes silica in an example. Treating the gas 30 refers to removing harmful substances contained in the gas 30.

The wet-type cyclone scrubber unit 100 treats the gas 30 with the liquid 40. The wet-type cyclone scrubber unit 100 may treat the gas 30 derived from the dry-type cyclone scrubber unit 200. The liquid 40 is introduced into the wet-type cyclone scrubber unit 100. The liquid 40 may be introduced from the introduction unit 600. The wet-type cyclone scrubber unit 100 treats the gas 30 with the liquid 40.

The gas 30 may travel in order from the dry-type cyclone scrubber unit 200 to the wet-type cyclone scrubber unit 100. That is, the gas 30 is treated in order from the dry-type cyclone scrubber unit 200 to the wet-type cyclone scrubber unit 100. The relatively large suspended matter is removed in the dry-type cyclone scrubber unit 200, and then a fine suspended matter is removed in the wet-type cyclone scrubber unit 100, which can then inhibit a decrease in a pressure loss of the gas 30 with a simple structure. Moreover, passage of the fine suspended matter can be prevented.

The gas derivation unit 300 is connected to the wet-type cyclone scrubber unit 100. The wet-type cyclone scrubber unit 100 derives the gas 30 treated in the wet-type cyclone scrubber unit 100 to the power generation apparatus 400.

The power generation apparatus 400 generates power with the gas 30. In this example, the power generation apparatus 400 has a turbine 410 and a power generator 420. The power generator 420 may generate power by rotating vanes of the turbine 410 with the gas 30. In FIG. 1, illustration of the vanes of the turbine 410 is omitted.

The gas recovery unit 500 may recover a liquid component contained in the gas 30 outputted by the power generation apparatus 400. The gas recovery unit 500 may be provided farther downstream in a traveling direction of the gas 30 than the turbine 410. The gas recovery unit 500 may cool the vapor of the gas 30 to recover the liquid. In this example, the gas recovery unit 500 has a recovery tank 510, a cooling tower 520, and a pump 530. In the gas recovery unit 500, the gas 30 may be introduced into the recovery tank 510. The recovery tank 510 cools the vapor contained in the gas 30, thereby making change of phase from vapor to liquid. The recovery tank 510 may cool the gas 30 by conducting heat exchange between the gas 30 and an introduced cooling medium. The cooling medium is, for example, water. The cooling tower 520 cools the cooling medium that has passed through the recovery tank 510. The cooling tower 520 may cool the cooling medium through air cooling or the like using a fan. The pump 530 circulates, through the recovery tank 510, the cooling medium cooled by the cooling tower 520. Moreover, the gas recovery unit 500 may recover condensed water 430 from a vicinity of the turbine 410. The liquid recovered by the gas recovery unit 500 from the gas 30 and at least a part of the condensed water 430 may be used as the liquid 40 in the wet-type cyclone scrubber unit 100, as described above. As a result, scale is less likely to be formed in the wet-type cyclone scrubber unit 100.

The liquid of the recovery tank 510 may be introduced into the reduction well 1200. The reduction well 1200 returns the vapor and the hot liquid used for power generation to the underground geothermal reservoir. The liquid 540 of the recovery tank 510 may also be introduced into the heating tank 610.

In this example, the scrubber apparatus for geothermal power generation 1000 includes a swirling unit 80. In FIG. 1, a structure of the swirling unit 80 is omitted. The swirling unit 80 swirls the gas 30 in a predetermined swirling direction. The swirling unit 80 improves swirling force of the gas 30, while mist in the gas 30 adheres to an inner wall of a reaction tower centrifugally to form a liquid film, which is discharged as discharged water of the wet-type cyclone scrubber unit 100. Therefore, vapor-liquid separation performance can be improved. It should be noted that, in this example, the swirling unit 80 is provided to the wet-type cyclone scrubber unit 100.

Figure 2:
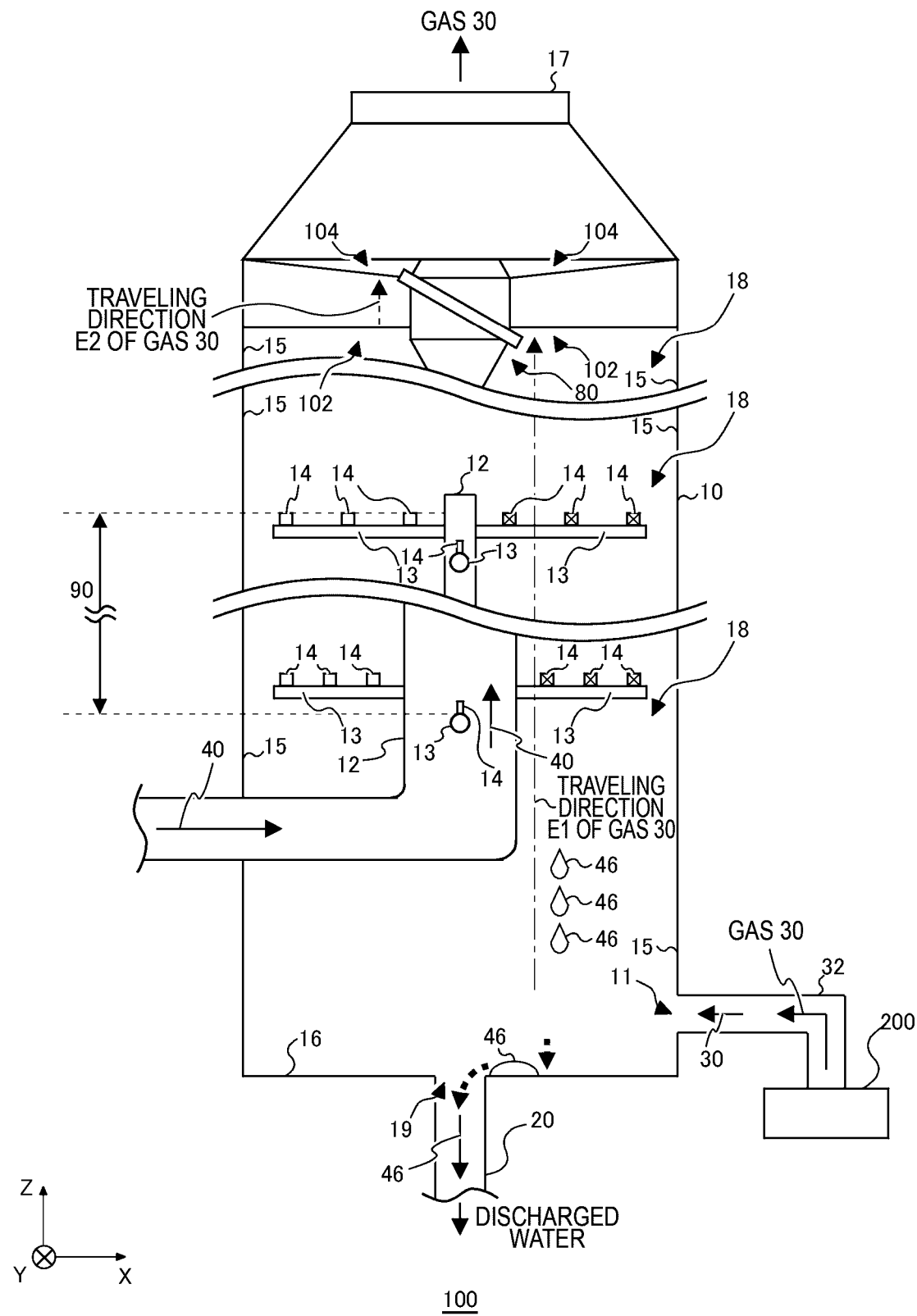
FIG. 2 shows an example of a wet-type cyclone scrubber unit 100.

FIG. 2 shows an example of a wet-type cyclone scrubber unit 100. The wet-type cyclone scrubber unit 100 has a reaction tower 10 and the swirling unit 80. The swirling unit 80 in this example is provided inside the reaction tower 10. The wet-type cyclone scrubber unit 100 may include a gas introduction tube 32 and a liquid discharge tube 20. In this example, the gas 30 is introduced into the reaction tower 10 from the dry-type cyclone scrubber unit 200.

The reaction tower 10 has a gas inlet port 11 through which the gas 30 is introduced and a gas outlet port 17 through which the gas 30 is discharged. The liquid 40 for treating the gas 30 is supplied to the reaction tower 10. The liquid 40 supplied to the reaction tower 10 treats the gas 30 inside the reaction tower 10. The liquid 40 treats the gas 30 and then becomes exhausted liquid 46.

The reaction tower 10 in this example has a side wall 15, a bottom surface 16, a gas treatment unit 18, and a liquid discharge port 19. The reaction tower 10 in this example is cylindrical. In this example, the gas outlet port 17 is arranged at a position facing the bottom surface 16 in a direction parallel to a central axis of the cylindrical reaction tower 10. In this example, the side wall 15 and the bottom surface 16 are respectively an interior surface and a bottom surface of the cylindrical reaction tower 10. The gas inlet port 11 may be provided to the side wall 15. In this example, the gas 30 passes through the gas inlet port 11 from the gas introduction tube 32, and then is introduced into the gas treatment unit 18. In FIG. 2 or the like, the reaction tower 10 is shown transparently as required.

The gas treatment unit 18 is a space surrounded by the side wall 15, the bottom surface 16, and the gas outlet port 17. The gas treatment unit 18 is in contact with the side wall 15, the bottom surface 16, and the gas outlet port 17. The gas treatment unit 18 is a space for treating the gas 30 inside the reaction tower 10. The bottom surface 16 is a surface onto which the exhausted liquid 46 falls. The exhausted liquid 46 passes through the liquid discharge port 19, and then is discharged to the liquid discharge tube 20. The exhausted liquid 46 may pass through the liquid discharge port 19 and the liquid discharge tube 20, to be introduced into the reduction well 1200, description of which is omitted in FIG. 2.

In this specification, a technical matter may be described by using orthogonal coordinate axes of an X axis, a Y axis, and a Z axis. In this specification, a plane parallel to the bottom surface 16 of the reaction tower 10 is defined as an XY plane, and a direction from the bottom surface 16 toward the gas outlet port 17 (a direction perpendicular to the bottom surface 16) is defined as the Z axis. In this specification, a predetermined direction in the XY plane is defined as an X-axis direction, and a direction orthogonal to the X axis in the XY plane is defined as a Y-axis direction.

A Z-axis direction may be parallel to a gravitational direction. When the Z-axis direction is parallel to the gravitational direction, the XY plane may be a horizontal plane. The Z-axis direction may be parallel to the horizontal direction. When the Z-axis direction is parallel to the horizontal direction, the XY plane may be parallel to the gravitational direction.

In this specification, when viewed from the side refers to when the wet-type cyclone scrubber unit 100 is viewed from a direction perpendicular to the Z axis (a predetermined direction in the XY plane). In this specification, a side view refers to a view when viewed from the side.

In the wet-type cyclone scrubber unit 100, the gas 30 introduced into the reaction tower 10 travels in a direction from the gas inlet port 11 to the gas outlet port 17 (the Z-axis direction in this example) while swirling inside the reaction tower 10. In this example, the gas 30 swirls in the XY plane when viewed in a direction from the gas outlet port 17 toward the bottom surface 16.

The reaction tower 10 has a liquid spray unit 90. The liquid spray unit 90 is provided between the gas inlet port 11 and the gas outlet port 17. The liquid spray unit 90 may be a part of a region between the gas inlet port 11 and the gas outlet port 17 in a traveling direction of the gas 30 (the Z-axis direction). The liquid spray unit 90 may be an entire region of the reaction tower 10 when the reaction tower 10 is viewed in the direction from the gas outlet port 17 toward the bottom surface 16 (in the XY plane). The liquid spray unit 90 sprays the liquid 40 into the reaction tower 10. In FIG. 2, a range of the liquid spray unit 90 inside the reaction tower 10 is indicated by a two-way arrow.

The reaction tower 10 may have one or more trunk tubes 12 to which the liquid 40 is supplied and one or more branch tubes 13. The reaction tower 10 may have one or more ejection units 14 for ejecting the liquid 40. In this example, the ejection unit 14 is connected to the branch tube 13, and the branch tube 13 is connected to the trunk tube 12.

In this example, the gas 30 travels inside the reaction tower 10 in the direction from the gas inlet port 11 to the gas outlet port 17 while swirling in the liquid spray unit 90 in a predetermined swirling direction. The traveling direction of the gas 30 from the gas inlet port 11 to the gas outlet port 17 inside the reaction tower 10 is defined as a traveling direction E1. In this example, the traveling direction E1 of the gas 30 is parallel to the Z axis. That is, in this example, the gas 30 travels in the traveling direction E1 when viewed from the side of the reaction tower 10 and swirls in the swirling direction when viewed from the traveling direction E1.

The wet-type cyclone scrubber unit 100 includes a plurality of ejection units 14 located in the liquid spray unit 90. As can be seen in FIG. 2, some ejection units 14 on one branch tube 13 are shown with "X" symbols and the ejection units 14 on the branch tube 13 on the opposite side of the liquid carrying trunk tube 12 are blank. It is readily understood from the use of the "X" symbols that the ejection units 14 on opposite sides of the liquid carrying trunk tube 12 face and eject liquid in opposite directions. It is readily understood that such an arrangement for ejecting liquid into the liquid spray unit 90 promotes the swirling of the gas in the liquid spray unit 90.

The swirling unit 80 has an introduction end 102 into which the gas 30 is introduced and a derivation end 104 from which the gas 30 is derived. The gas 30 travels inside the swirling unit 80 in a direction from the introduction end 102 to the derivation end 104. The traveling direction of the gas 30 from the introduction end 102 to the derivation end 104 is defined as a traveling direction E2. In this example, the traveling direction E2 is parallel to the Z axis. That is, in this example, the gas 30 travels in the traveling direction E2 when viewed from the side of the swirling unit 80 and swirls in the predetermined swirling direction when viewed from the traveling direction E2.

The introduction end 102 is provided farthest upstream of the gas 30 in the traveling direction E2 of the gas 30. The introduction end 102 may be an end provided on the inlet side of the gas 30 in the swirling unit 80. The introduction end 102 may be a planar region including the end provided farthest upstream of the gas 30. That planar region may intersect the traveling direction E2 of the gas 30. The gas 30 may pass through that planar region.

The derivation end 104 is provided farthest downstream of the gas 30 in the traveling direction E2 of the gas 30. The introduction end 102 may be an end on the outlet side of the gas 30 in the swirling unit 80. The derivation end 104 may be a planar region including the end provided farthest downstream of the gas 30. That planar region may intersect the traveling direction E2 of the gas 30. The gas 30 may pass through that planar region.

The swirling unit 80 is arranged farther downstream than the liquid spray unit 90 in a gas flow channel including the wet-type cyclone scrubber unit 100 and the gas derivation unit 300. The swirling unit 80 in this example is provided farther downstream of the gas 30 than the liquid spray unit 90 in the traveling direction of the gas 30 (the Z-axis direction in this example). In this example, the swirling unit 80 is provided between the liquid spray unit 90 and the gas outlet port 17 in the Z-axis direction. As described later, the swirling unit 80 increases a velocity of the gas 30.

The liquid 40 is the hot liquid 1120 from the production well 1100. Therefore, the liquid 40 may contain silica, sulfide, and the like. Moreover, the liquid 40 may contain a scale inhibitor.

Figure 3:
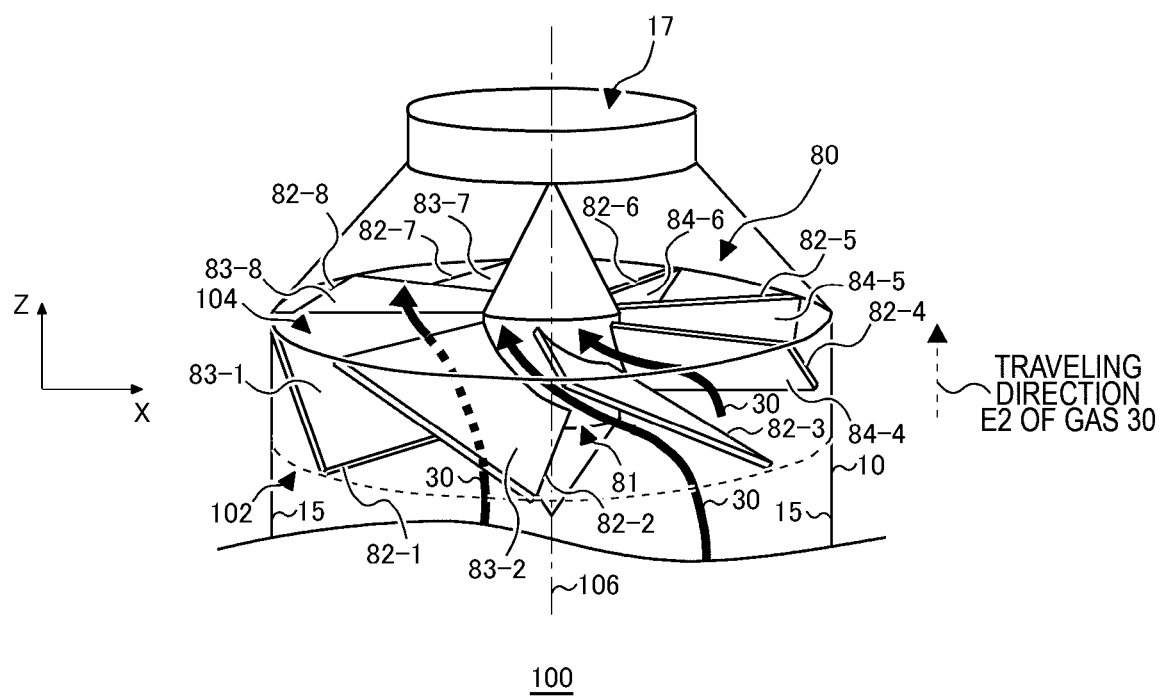
FIG. 3 is a perspective view showing an example of a swirling unit 80 in FIG. 2.

FIG. 3 is a perspective view showing an example of the swirling unit 80 in FIG. 2. The swirling unit 80 in this example is provided farther downstream of the gas 30 than the liquid spray unit 90 (see FIG. 2) in the traveling direction E2 of the gas 30 inside the reaction tower 10. The swirling unit 80 in this example is provided between the liquid spray unit 90 and the gas outlet port 17 in the traveling direction E2 of the gas 30.

The swirling unit 80 swirls the gas 30 in a predetermined swirling direction when viewed in a direction from the derivation end 104 toward the introduction end 102 (the Z-axis direction). It should be noted that, in this example, the swirling direction in the reaction tower 10 and the swirling direction in the swirling unit 80 are the same.

The gas 30 swirled by the swirling unit 80 may swirl around a predetermined central axis 106 when viewed from the traveling direction E2 of the gas 30. In FIG. 3, this central axis 106 is indicated by a dashed-dotted line.

When viewed from the traveling direction E2 of the gas 30, the central axis 106 may or may not be parallel to the central axis of the cylindrical reaction tower 10. In this example, the central axis 106 is parallel to the central axis of the reaction tower 10.

A position of the central axis 106 when viewed from the traveling direction E2 of the gas 30 may or may not coincide with a position of the central axis of the reaction tower 10 when viewed from the traveling direction E1 (see FIG. 2) of the gas 30. In this example, the position of the central axis 106 when viewed from the traveling direction E2 and the position of the central axis of the reaction tower when viewed from the traveling direction E1 coincide with each other.

The swirling unit 80 in this example has a supporting bar 81 and a vane 82. The supporting bar 81 may be arranged at the position of the central axis 106 when viewed from the traveling direction E2 of the gas 30. The supporting bar 81 may be cylindrical with a central axis parallel to the central axis 106. A position of a central axis of the cylindrical supporting bar 81 when viewed from the traveling direction E2 of the gas 30 may coincide with the position of the central axis 106.

In this example, the vane 82 is connected to the supporting bar 81. The swirling unit 80 may have a plurality of vanes 82. The swirling unit 80 in this example has eight vanes 82 (vanes 82-1 to 82-8).

The vane 82 may be tabular with a front surface 83 and a back surface 84. In this example, the front surface 83 of the vane 82 is visible when viewed from the traveling direction E2 of the gas 30, and the back surface 84 of the vane 82 is visible when viewed from a direction opposite the traveling direction E2. The vanes 82-1 to 82-8 in this example respectively have front surfaces 83-1 to 83-8. The vanes 82-1 to 82-8 in this example respectively have back surfaces 84-1 to 84-8. The back surface 84 is inclined at a predetermined angle with respect to the XY plane. The front surface 83 may be inclined at a predetermined angle with respect to the XY plane.

The gas 30 traveling to the gas outlet port 17 while swirling in the liquid spray unit 90 passes through the liquid spray unit 90, and then is introduced into the swirling unit 80. The gas 30 introduced into the swirling unit 80 passes inside the swirling unit 80, and then is derived from the swirling unit 80. In this example, that gas 30 passes between the back surface 84 of one vane 82 and the front surface 83 of another vane 82 adjacent to that one vane 82. Taking the vane 82-3 and the vane 82-4 as an example, the gas 30 passes between the back surface 84-4 of the vane 82-4 and the front surface 83-3 of the vane 82-3. In FIG. 3, this flow channel of the gas 30 is indicated by a bold arrow.

The swirling unit 80 increases a velocity of the gas 30 introduced into the swirling unit 80 or controls a traveling direction of that gas 30. The swirling unit 80 may increase that velocity and control that traveling direction.

The swirling unit 80 in this example increases the velocity of the gas 30 introduced into the swirling unit 80. The swirling unit 80 in this example increases the velocity of the gas 30 inside the swirling unit 80. The velocity of the gas 30 before being introduced into the swirling unit 80 is defined as a velocity V1. The velocity of the gas 30 after being derived from the swirling unit 80 is defined as a velocity V2. In this example, the velocity V2 is greater than the velocity V1. The bold arrows shown in FIG. 3 are examples of a direction of the flow channel of the gas 30 passing through the swirling unit 80.

In this example, when viewed from the traveling direction E2 of the gas 30, the gas 30 travels from the introduction end 102 to the derivation end 104 while swirling around the supporting bar 81. The velocity of the gas 30 refers to a velocity in a tangential direction of the flow channel of the gas 30 at any position in the XY plane in the flow of the gas 30 when viewed from the traveling direction E2 of the gas 30.

Under standard conditions of a standard temperature of 0° C. and a standard pressure of 1 atm, the velocity V1 may be 5 m/s or more and 25 m/s or less, or may be 10 m/s or more and 20 m/s or less. The velocity V2 may be 30 m/s or more and 50 m/s or less, or may be 35 m/s or more and 45 m/s or less.

Geothermal power generation equipment is often installed in a mountainous area or the like, and a large apparatus footprint involves a civil engineering work cost. In this example, the swirling unit 80 is provided inside the reaction tower 10. Therefore, an apparatus footprint and a connecting piping work cost can be reduced.

Moreover, in this example, the swirling unit 80 is provided to a large-diameter portion of the reaction tower 10. The large-diameter portion of the reaction tower 10 has the largest cross section among cross sections in the XY plane of the reaction tower 10. The swirling unit 80 is provided to the large-diameter portion of the reaction tower 10, which can then increase an area of cross section through which the gas 30 passes and reduce a pressure loss.

Figure 4:
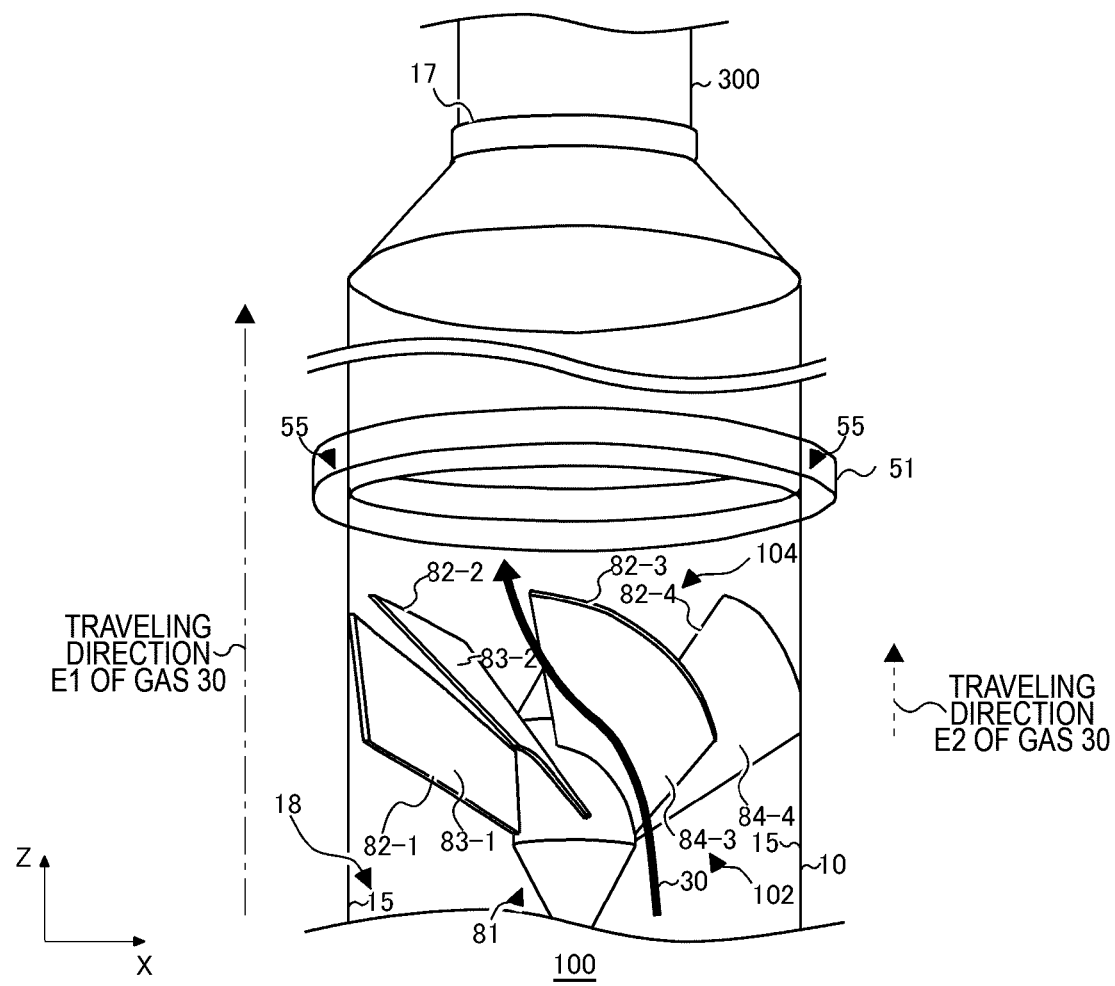
FIG. 4 shows another example of the wet-type cyclone scrubber unit 100 according to one embodiment of the present invention.

FIG. 4 shows another example of the wet-type cyclone scrubber unit 100 according to one embodiment of the present invention. The wet-type cyclone scrubber unit 100 in this example further includes one or more liquid recovery units 51 for recovering the liquid 40 that has treated the gas 30. The wet-type cyclone scrubber unit 100 in this example is different from the wet-type cyclone scrubber unit 100 shown in FIG. 2 in this respect. The liquid recovery unit 51 is provided farther downstream of the gas 30 than the swirling unit 80 in the traveling direction E1 of the gas 30 (on a gas outlet port 17 side). The liquid recovery unit 51 in this example is provided to the side wall 15 of the reaction tower 10.

The wet-type cyclone scrubber unit 100 in this example includes the swirling unit 80 farther downstream of the gas 30 than the liquid spray unit 90 in the traveling direction of the gas 30. Moreover, the swirling unit 80 in this example increases the velocity of the gas 30 after passing through the liquid spray unit 90. As a result, mist of liquid 40 traveling from the liquid spray unit 90 to the gas outlet port 17 along with the gas 30 is likely to be cumulated on the side wall 15, farther downstream of the gas 30 than the swirling unit 80. When the mist of liquid 40 is cumulated on the side wall 15, that liquid 40 is likely to form a liquid film. The liquid recovery unit 51 recovers that liquid 40 cumulated on the side wall 15.

In this example, one liquid recovery unit 51 is circularly provided in a circumferential direction of the side wall 15. In this example, the liquid recovery unit 51 includes a recovery chamber 55 for recovering the liquid 40 that has treated the gas 30.

Figure 5:
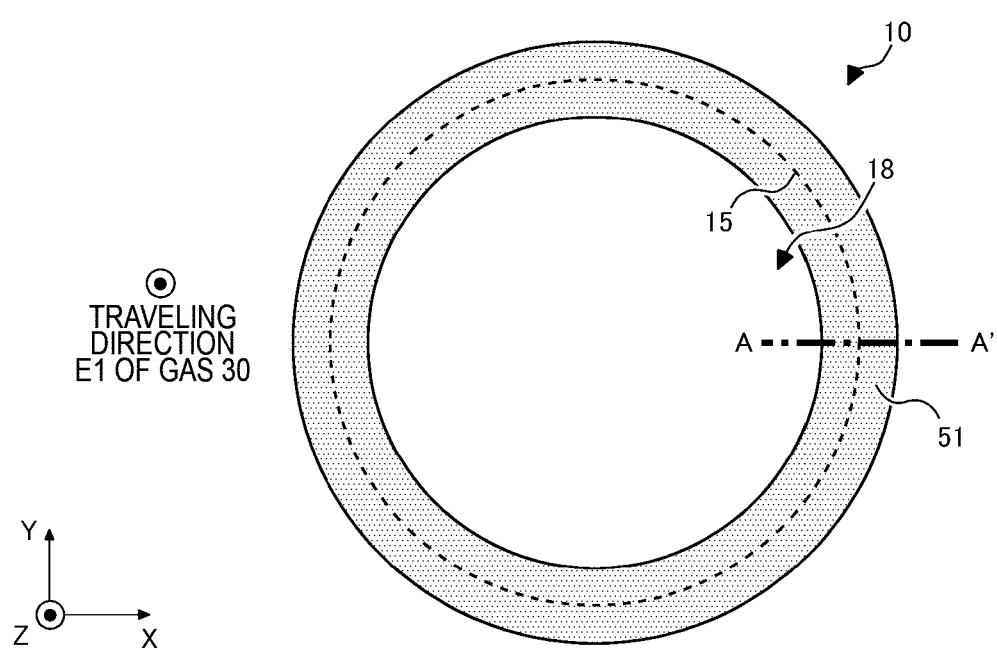
FIG. 5 shows an example of a liquid recovery unit 51 shown in FIG. 4 when a reaction tower 10 is viewed from a traveling direction E1 of gas 30.

FIG. 5 shows an example of a liquid recovery unit 51 shown in FIG. 4 when a reaction tower 10 is viewed from a traveling direction E1 of gas 30. In this example, one liquid recovery unit 51 is circularly arranged in the circumferential direction of the side wall 15 at a position overlapping the side wall 15 when viewed from the traveling direction E1 of the gas 30. In FIG. 5, a position of the liquid recovery unit 51 when viewed from the traveling direction E1 of the gas 30 is indicated by hatching. The liquid recovery unit 51 may be arranged across the side wall 15 from inside to outside the reaction tower 10 when viewed from the traveling direction E1 of the gas 30. In FIG. 5, a position of the side wall 15 when viewed from the traveling direction E1 of the gas 30 is indicated by a dashed line.

Figure 6:
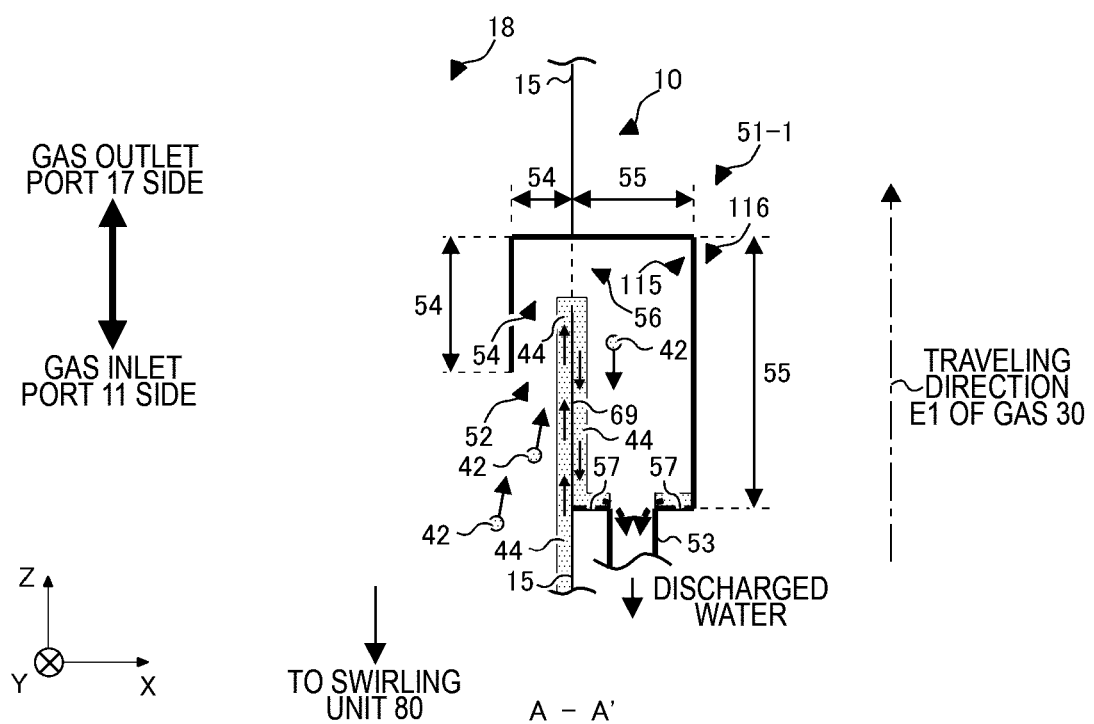
FIG. 6 shows an example of a cross section taken along A-A' in FIG. 5.

FIG. 6 shows an example of a cross section taken along A-A' in FIG. 5. The cross section taken along A-A' is an XZ cross section passing through the gas treatment unit 18, the side wall 15, and the liquid recovery unit 51 of the reaction tower 10.

In this example, the liquid recovery unit 51 has a first introduction unit 54, a recovery chamber 55, and a water discharge unit 53. The first introduction unit 54 and the recovery chamber 55 may be respectively provided inside and outside the reaction tower 10. In FIG. 6, ranges in the XZ cross section of the first introduction unit 54 and the recovery chamber 55 are indicated by two-way arrows. The water discharge unit 53 may be provided to a bottom surface 57 of the recovery chamber 55.

In this example, the liquid recovery unit 51 is provided with a first opening 52 and an opening 56. The liquid 40 having treated the gas 30 is introduced into the first opening 52. In this example, the first opening 52 is provided inside the reaction tower 10. In this example, the gas treatment unit 18 of the reaction tower 10 and the first introduction unit 54 communicate with each other via the first opening 52. The first opening 52 may be provided to an end of the first introduction unit 54 on a gas inlet port 11 side. In this example, the first introduction unit 54 and the recovery chamber 55 communicate with each other via the opening 56. A position in the X-axis direction of the opening 56 may coincide with a position in the X-axis direction of the side wall 15. The opening 56 may connect an inside of the liquid recovery unit 51 and the reaction tower 10. In this example, the liquid recovery unit 51 is provided to the reaction tower 10, but when the liquid recovery unit 51 is provided to the gas derivation unit 300 (see FIG. 10, FIG. 12), the opening 56 may connect the inside of the liquid recovery unit 51 and the gas derivation unit 300.

As described above, the liquid 40 treats the gas 30 in the liquid spray unit 90 (see FIG. 2). The liquid 40 having treated the gas 30 may be accompanied by the mist of liquid 40. As described above, when the swirling unit 80 is provided to the reaction tower 10, the gas 30 swirled by the swirling unit 80 is likely to pass through the outer peripheral side (the side wall 15 side) of the reaction tower 10.

The mist of liquid 40 accompanying the gas 30 swirled by the swirling unit 80 is defined as a droplet 42. The droplet 42 is likely to form a liquid film on the side wall 15. That droplet 42 having formed the liquid film on the side wall 15 is defined as a liquid film 44. In FIG. 6, the droplet 42 and the liquid film 44 are indicated by hatching. The gas 30 swirled by the swirling unit 80 travels in the traveling direction E1 of the gas 30 (from the gas inlet port 11 side to the gas outlet port 17 side). As a result, the liquid film 44 is likely to travel from the gas inlet port 11 side to the gas outlet port 17 side along the side wall 15.

In this example, the liquid film 44 traveling in the traveling direction E1 of the gas 30 is recovered by the liquid recovery unit 51 through the first opening 52. In this example, the first opening 52 is provided to the end of the gas inlet port 11 side of the first introduction unit 54, which then facilitates the recovery by the liquid recovery unit 51 of the liquid film 44 traveling from the gas inlet port 11 side to the gas outlet port 17 side along the side wall 15.

The liquid film 44 travels along the side wall 15 of the reaction tower 10 from the gas inlet port 11 side to the gas outlet port 17 side, and then is recovered into the recovery chamber 55 through the opening 56. The liquid film 44 recovered into the recovery chamber 55 travels along a side wall 69 of the recovery chamber 55 from the gas outlet port 17 side to the gas inlet port 11 side. The bottom surface 57 of the recovery chamber 55 is provided with the water discharge unit 53. The liquid film 44 having traveled along the side wall 69 of the recovery chamber 55 from the gas outlet port 17 side to the gas inlet port 11 side is discharged through the water discharge unit 53. The liquid film 44 may be introduced into the reduction well 1200.

The wet-type cyclone scrubber unit 100 in this example further includes the liquid recovery unit 51. This allows the liquid recovery unit 51 to recover the liquid film 44 in the wet-type cyclone scrubber unit 100 in this example. As a result, as compared with a case where the wet-type cyclone scrubber unit 100 does not include the liquid recovery unit 51, the liquid 40 is less likely to be discharged along with the gas 30 to the turbine 410 and the power generator 420 outside the wet-type cyclone scrubber unit 100. As a result, the wet-type cyclone scrubber unit 100 in this example is less likely to corrode steel materials of the turbine 410 and the power generator 420 or the like.

Since the liquid 40 contains silica, scale is likely to be formed when the liquid recovery unit 51 is formed of metal or the like. Therefore, the liquid recovery unit 51 may be formed of a protection material. That is, the liquid recovery unit 51 may be entirely formed of the protection material. The protection material has a hydrogen bonding force weaker than that of a material forming the side wall 15 (that is, the reaction tower 10). Alternatively, the protection material has an electrical attraction force weaker than that of the material forming the side wall 15. The liquid recovery unit 51 is formed of a material having a relatively weak hydrogen bonding force or weak electrical attraction force, which can then inhibit adhesion of silica and prevent formation of scale. Moreover, the liquid recovery unit 51 may be partially formed of the protection material. For example, only the recovery chamber 55 may be formed of the protection material. The protection material may be resin. The protection material may be, for example, engineering plastic having high heat resistance, corrosion resistance, and structural strength, such as fluororesin, vinyl chloride, polyethylene, polypropylene, or the like. In addition, the protection material may be carbon-based coating such as DLC (diamond-like carbon). The protection material may be paint.

Moreover, the liquid recovery unit 51 may be coated with the protection material on its surface. An inner wall of the liquid recovery unit 51 may be coated with the protection material. The inner wall of the liquid recovery unit 51 is, for example, a wall 115 on an inner portion of the recovery chamber 55. An outer wall of the liquid recovery unit 51 may be coated with the protection material. The outer wall of the liquid recovery unit 51 is, for example, a wall 116 on an outer portion of the recovery chamber 55. The coated surface can also inhibit the adhesion of silica and prevent the formation of scale.

Moreover, the opening 56 may also be coated with the protection material on its surface. The fact that the opening 56 is coated with the protection material may be that the side wall 15 in a vicinity of the opening 56 is coated with the protection material. Moreover, the fact that the opening 56 is coated with the protection material may be that the side wall 69 in the vicinity of the opening 56 is coated with the protection material. A large amount of liquid 40 flows in the vicinity of the opening 56, which can then inhibit the adhesion of silica and prevent the formation of scale.

Figure 7:
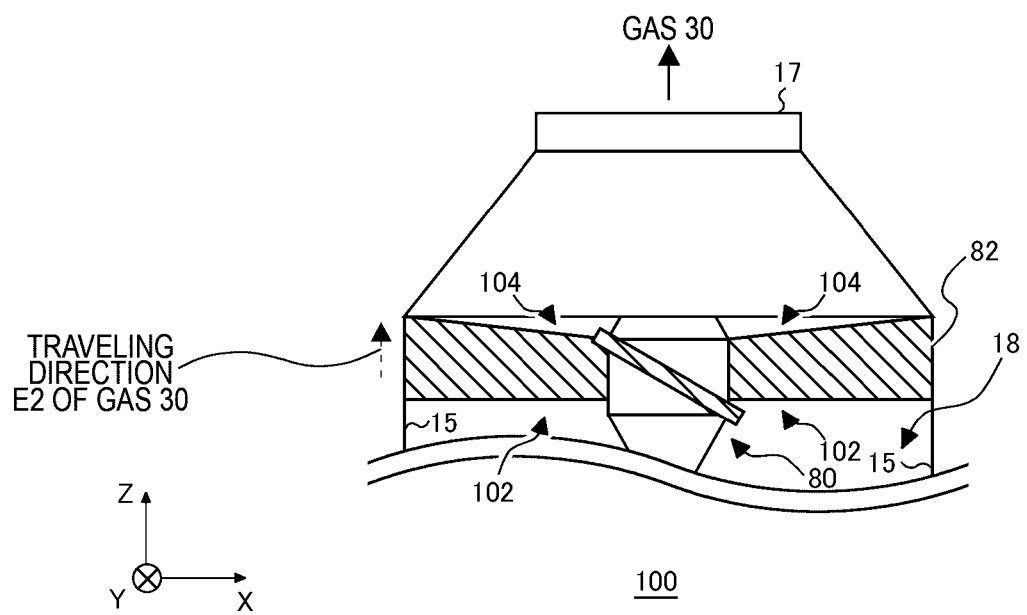
FIG. 7 shows another example of the swirling unit 80 in FIG. 2.
Figure 8:
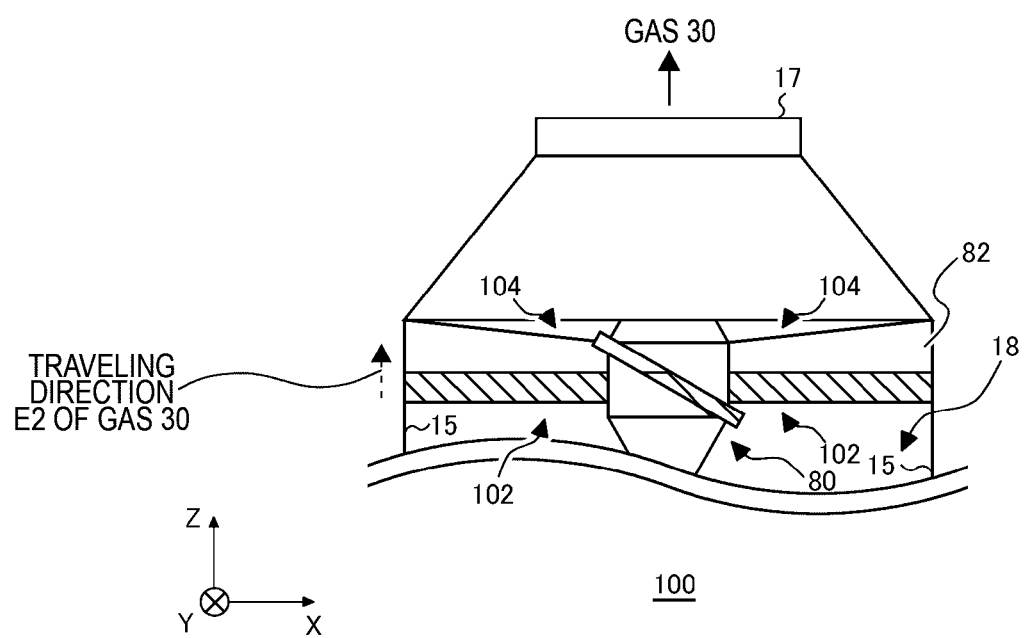
FIG. 8 shows another example of the swirling unit 80 in FIG. 2.

FIG. 7 and FIG. 8 show other examples of the swirling unit 80 in FIG. 2. In FIG. 7 and FIG. 8, the swirling unit 80 is coated with the protection material described above. In FIG. 7 and FIG. 8, the plurality of vanes 82 are coated with the protection material. In FIG. 7 and FIG. 8, ranges coated with the protection material are indicated by hatching.

In FIG. 7, the vane 82 of the swirling unit 80 is coated with the protection material. In this example, the vane 82 of the swirling unit 80 is entirely coated with the protection material. Coating the vane 82 of the swirling unit 80 with the protection material can prevent the formation of scale.

In FIG. 8, the vane 82 of the swirling unit 80 is coated with the protection material only on an upstream side in the traveling direction E2 of the gas 30. Scale is more likely to be formed on the upstream side than on the downstream side, which allows even such a configuration to prevent the formation of scale.

Moreover, in FIG. 2, the liquid spray unit 90 may be formed of the protection material. Since scale is likely to be formed particularly at the ejection unit 14, the ejection unit 14 may be formed of the protection material. Even such a configuration can prevent the formation of scale.

Moreover, the ejection unit 14 may be coated with the protection material in a vicinity of an opening surface where the liquid 40 is ejected. Only an inner portion of the ejection unit 14 may be coated with the protection material. The inner portion of the ejection unit 14 may be in direct contact with the liquid 40. Since the particulate dusts contain earth and sand or the like, an outer portion of the ejection unit 14 is preferably formed of a durable material such as metal.

Figure 9:
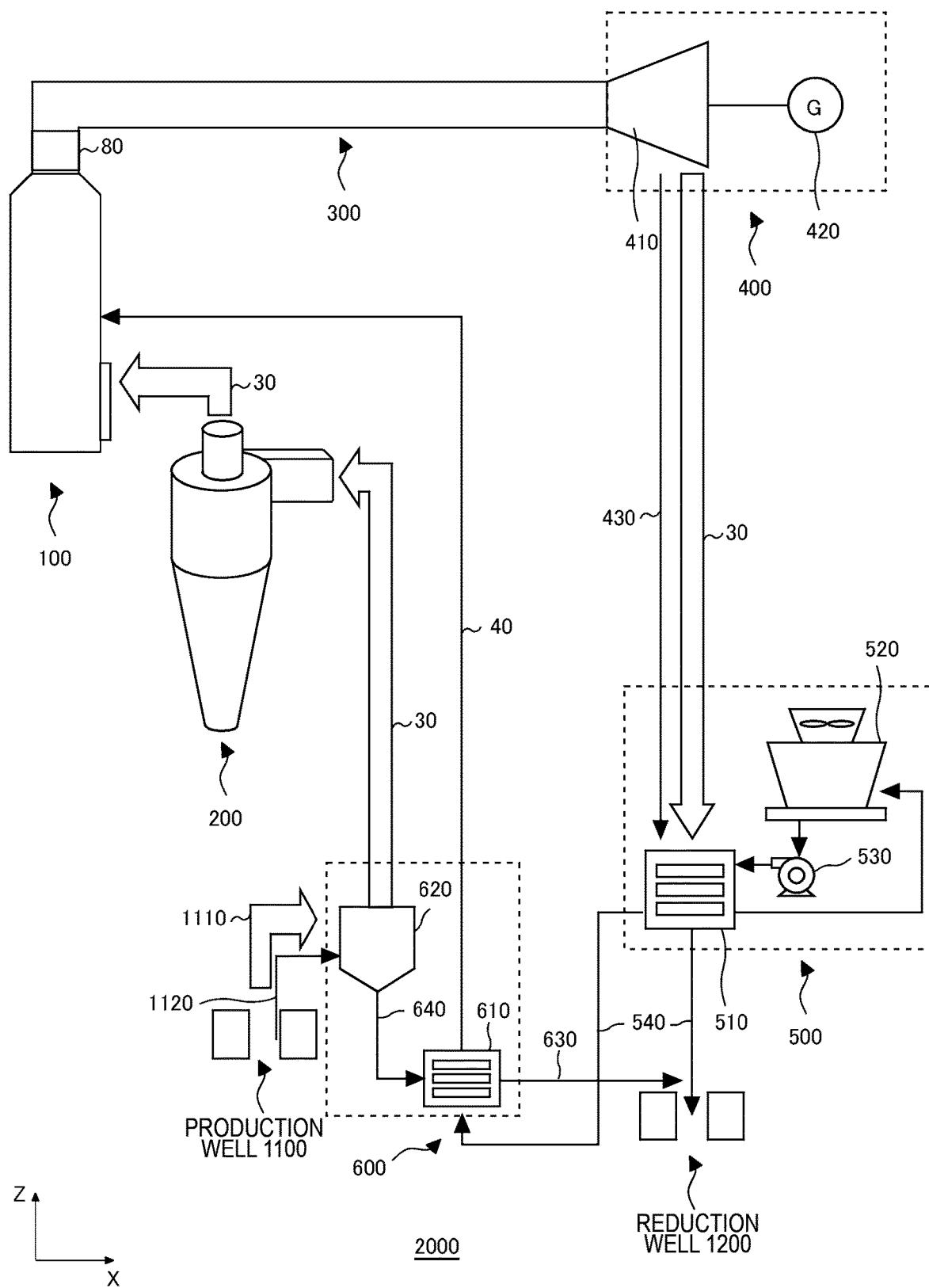
FIG. 9 shows an example of a scrubber apparatus for geothermal power generation 2000 according to another embodiment of the present invention.

FIG. 9 shows an example of a scrubber apparatus for geothermal power generation 2000 according to another embodiment of the present invention. The scrubber apparatus for geothermal power generation 2000 in FIG. 9 is different from the scrubber apparatus for geothermal power generation 1000 in FIG. 1 in that the swirling unit 80 is provided to the gas derivation unit 300. Except for that configuration, the scrubber apparatus for geothermal power generation 2000 may have the same configuration as that of the scrubber apparatus for geothermal power generation 1000.

Figure 10:
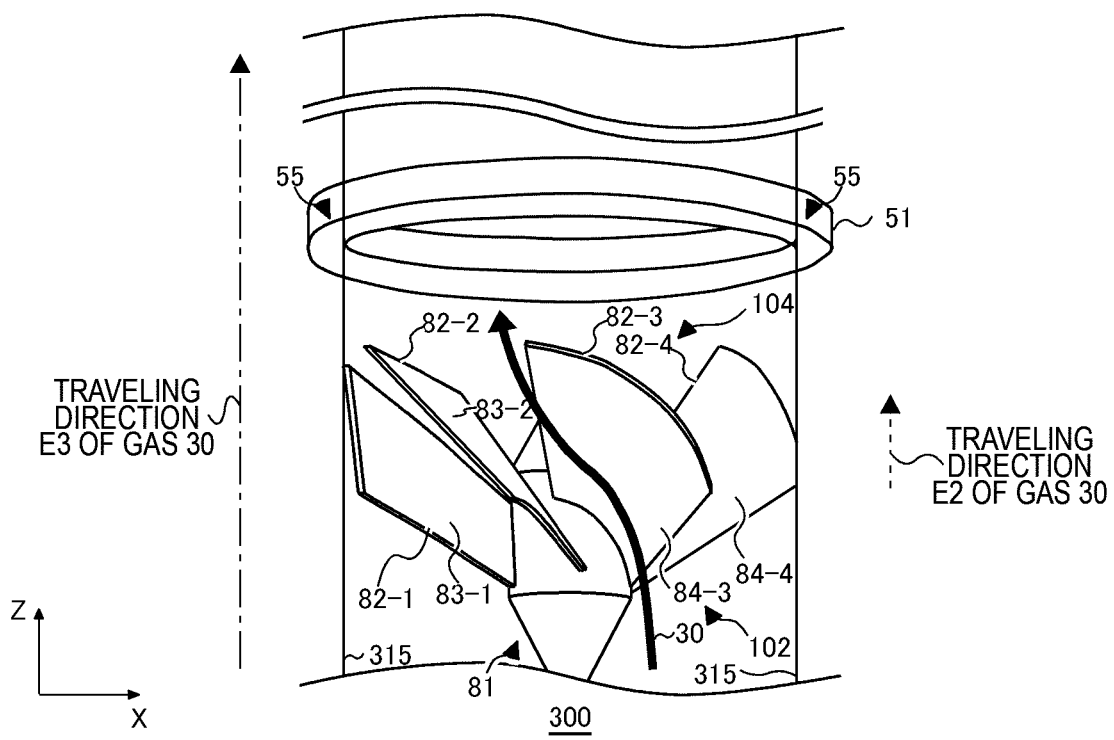
FIG. 10 shows an example of the swirling unit 80 in the scrubber apparatus for geothermal power generation 2000.

FIG. 10 shows an example of the swirling unit 80 in the scrubber apparatus for geothermal power generation 2000. In this example, the swirling unit 80 and the liquid recovery unit 51 are provided to the gas derivation unit 300. In FIG. 10, a traveling direction of the gas 30 in the gas derivation unit 300 is defined as E3. In this example, a traveling direction E3 of the gas 30 in the gas derivation unit 300 is parallel to the Z-axis direction, or the traveling direction E3 of the gas 30 in the gas derivation unit 300 is parallel to the traveling direction E2. Moreover, a side wall of the gas derivation unit 300 is defined as a side wall 315.

In this example, the swirling unit 80 is provided to the gas derivation unit 300 having a diameter smaller than that of the reaction tower 10. Therefore, the swirling unit 80 can be downsized and costs can be reduced. Moreover, downsizing leads to a reduced swirling radius, which can provide an increased swirling force.

Figure 11:
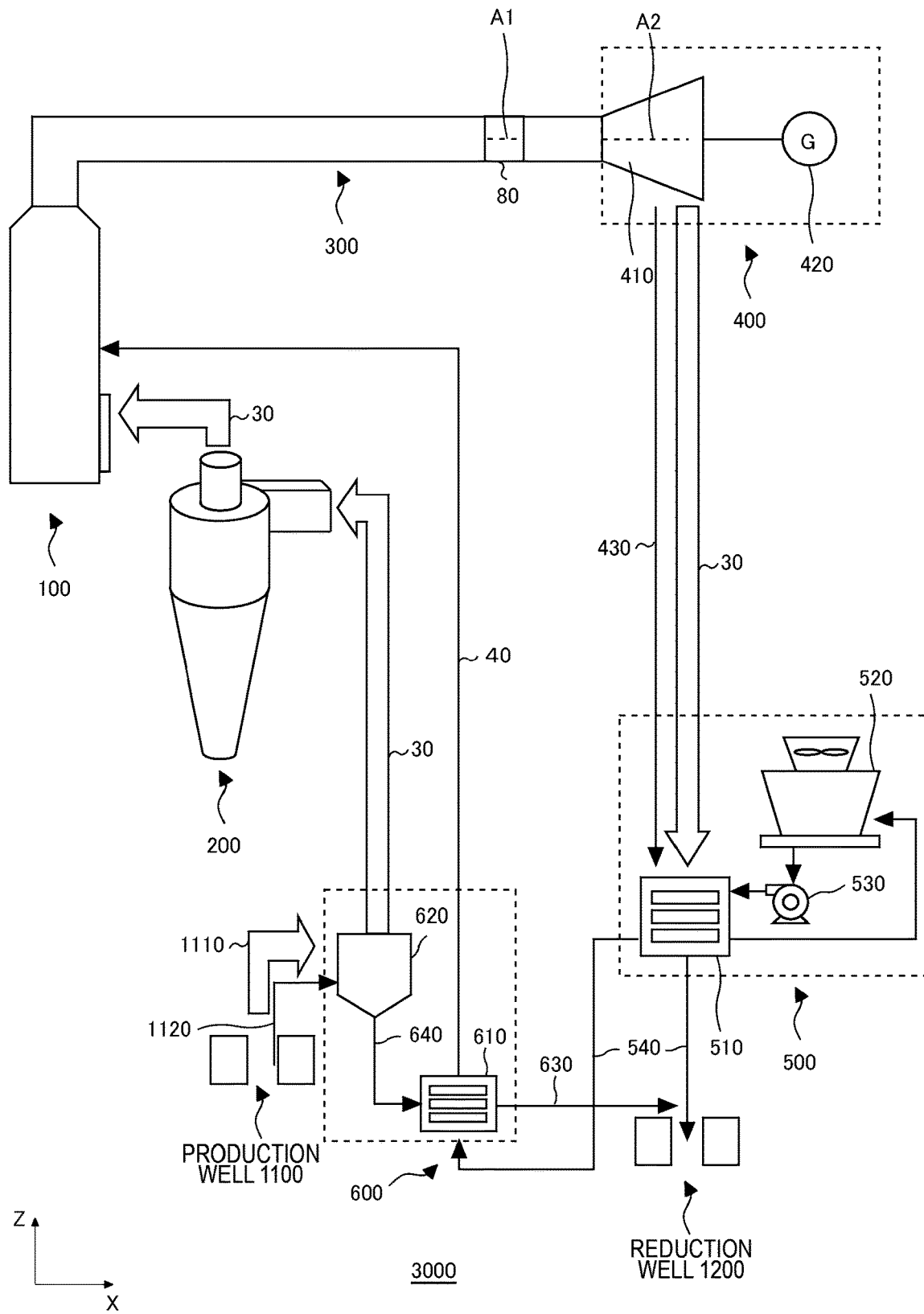
FIG. 11 shows an example of a scrubber apparatus for geothermal power generation 3000 according to another embodiment of the present invention.

FIG. 11 shows an example of a scrubber apparatus for geothermal power generation 3000 according to another embodiment of the present invention. The scrubber apparatus for geothermal power generation 3000 in FIG. 11 is different from the scrubber apparatus for geothermal power generation 2000 in FIG. 9 in a position where the swirling unit 80 is provided. Except for that configuration, the scrubber apparatus for geothermal power generation 3000 may have the same configuration as that of the scrubber apparatus for geothermal power generation 2000.

In FIG. 11, an axis of the swirling unit 80 is defined as A1. The axis A1 of the swirling unit 80 may be the central axis 106 (see FIG. 12) of the swirling unit 80. A position of the axis A1 of the swirling unit 80 may coincide with the position of the central axis 106 of the supporting bar 81 (see FIG. 12). Moreover, a rotational axis of the turbine 410 is defined as A2. The rotational axis of the turbine 410 is an axis on which the vanes of the turbine 410 rotate. In FIG. 11, illustration of the vanes of the turbine 410 is omitted.

In this example, the swirling unit 80 is provided to the gas derivation unit 300, while the axis A1 of the swirling unit 80 and the rotational axis A2 of the turbine 410 are coaxially provided. In this example, the axis A1 of the swirling unit 80 and the rotational axis A2 of the turbine 410 are each parallel to the X-axis direction. Making the axis A1 of the swirling unit 80 and the rotational axis A2 of the turbine 410 coaxial can reduce an energy loss of geothermal steam. Moreover, arranging the swirling unit 80 and the reaction tower 10 apart from each other allows arrangement of the scrubber apparatus for geothermal power generation 3000 to be more flexibly changed. Moreover, the fact that the axis A1 of the swirling unit 80 and the rotational axis A2 of the turbine 410 are coaxially provided is not limited to that the axis A1 of the swirling unit 80 and the rotational axis A2 of the turbine 410 are completely coaxially provided. For example, if the axis A1 of the swirling unit 80 and the rotational axis A2 of the turbine 410 are parallel to each other and the swirling unit 80 and at least a part of the turbine 410 are provided on a straight line (on the X-axis direction in this example), it may be considered that the axis A1 of the swirling unit 80 and the rotational axis A2 of the turbine 410 are coaxial.

Figure 12:
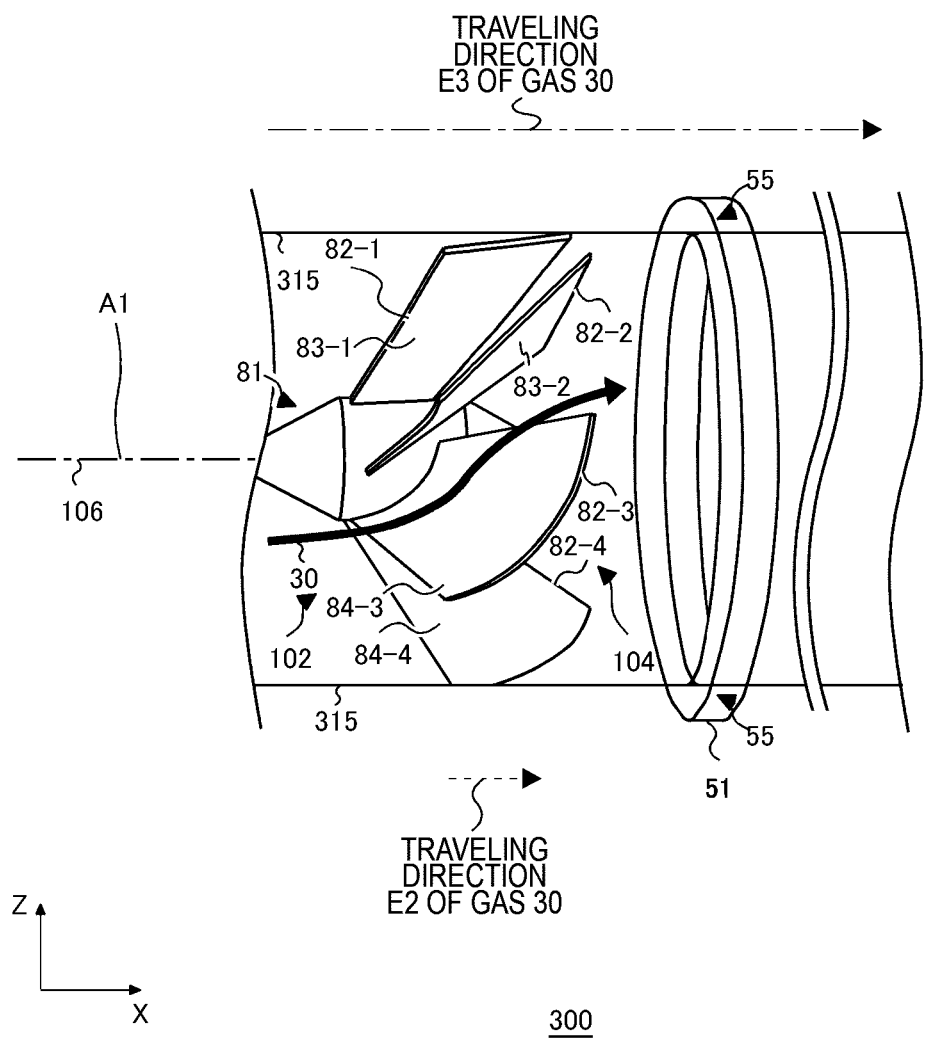
FIG. 12 shows an example of the swirling unit 80 in the scrubber apparatus for geothermal power generation 3000.

FIG. 12 shows an example of the swirling unit 80 in the scrubber apparatus for geothermal power generation 3000. In this example, the swirling unit 80 and the liquid recovery unit 51 are provided to the gas derivation unit 300. In FIG. 12, the traveling direction of the gas 30 in the gas derivation unit 300 is defined as E3. In this example, the traveling direction E3 of the gas 30 in the gas derivation unit 300 is parallel to the X-axis direction. Moreover, the traveling direction E3 of the gas 30 in the gas derivation unit 300 is parallel to the traveling direction E2. In FIG. 12, the central axis 106 of the swirling unit 80 is indicated by a dashed-dotted line. In FIG. 12, the axis A1 of the swirling unit 80 coincides with the position of the central axis 106.

Figure 13:
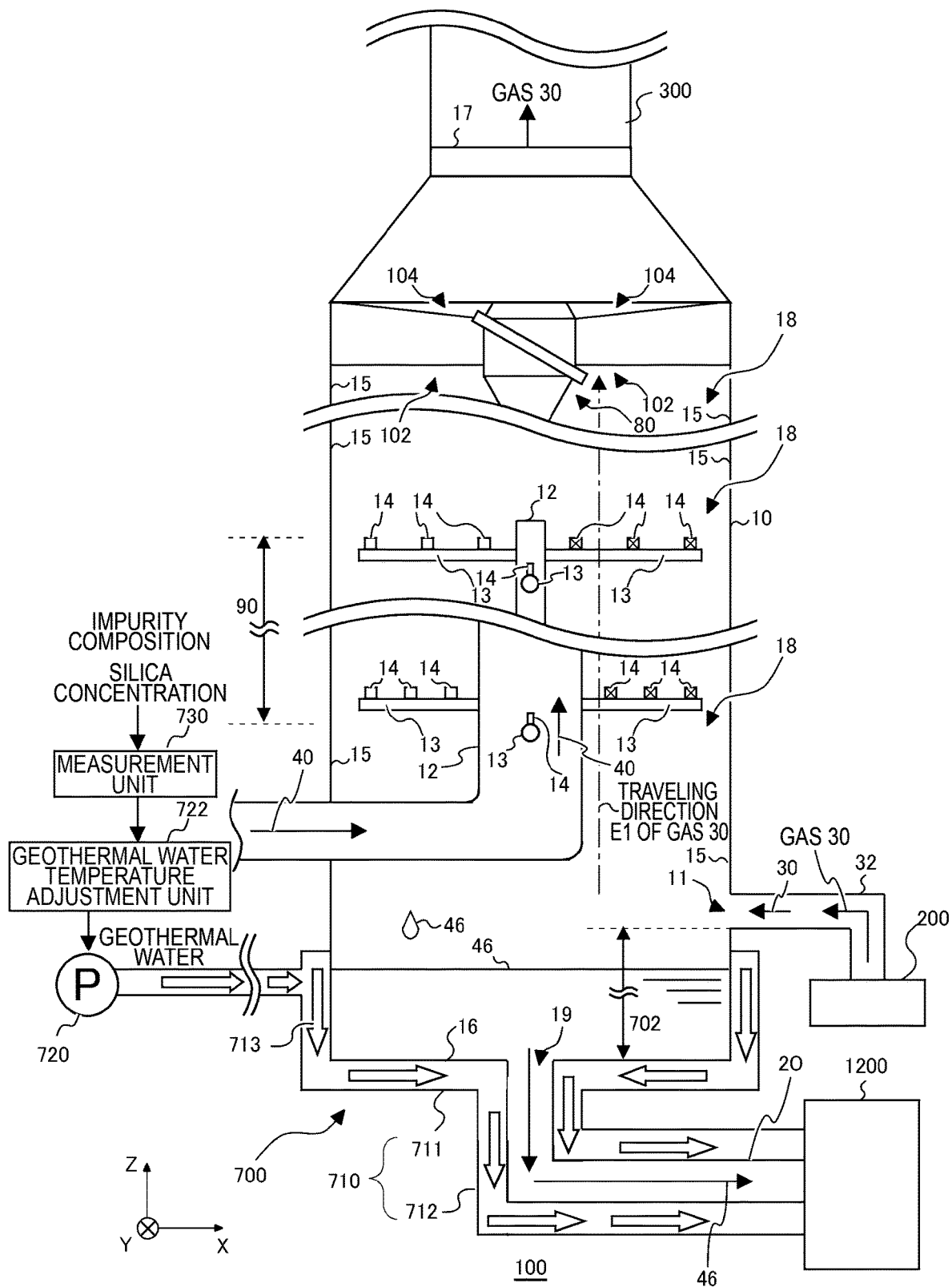
FIG. 13 shows another example of the wet-type cyclone scrubber unit 100 in the scrubber apparatus for geothermal power generation 1000.

FIG. 13 shows another example of the wet-type cyclone scrubber unit 100 in the scrubber apparatus for geothermal power generation 1000. As in FIG. 2, the wet-type cyclone scrubber unit 100 includes the reaction tower 10. The gas treatment unit 18 as an internal space is formed in the reaction tower 10. The scrubber apparatus for geothermal power generation 1000 may include the gas introduction tube 32 and the liquid discharge tube 20. In this example, the gas 30 is introduced into the reaction tower 10 from the dry-type cyclone scrubber unit 200. In this example, the reaction tower 10 may have an internal configuration similar to that shown in FIG. 2.

In this example, the gas inlet port 11 is provided to the side surface at a position in the Z-axis direction closer to the bottom surface 16 than to the gas outlet port 17 when viewed from the side. A portion that is close to the liquid discharge port 19 with respect to the gas inlet port 11 in the reaction tower 10 is referred to as a liquid discharge region 702.

The wet-type cyclone scrubber unit 100 in this example includes a heating unit 700. The heating unit 700 is provided to at least one of the liquid discharge region 702 and a portion of the liquid discharge tube 20 that is connected farther downstream than the liquid discharge port 19, and heats the exhausted liquid 46. The heating unit 700 may include a first heating unit for heating the liquid discharge region 702 of the reaction tower 10 and a second heating unit for heating that portion of the liquid discharge tube 20. In this example, the heating unit 700 may heat with geothermal water 713 at least parts of the liquid discharge region 702 and of the liquid discharge tube 20, of the wet-type cyclone scrubber unit 100. The geothermal water 713 may be the hot liquid 1120 pumped from the production well 1100, or may be a liquid whose temperature has been adjusted by diluting the hot liquid 1120 as required.

The heating unit 700 includes a heating tube arrangement 710 and a pump 720. The heating tube arrangement 710 may include a first heating tube arrangement 711 and a second heating tube arrangement 712. The first heating tube arrangement 711 is, in the liquid discharge region 702 of the reaction tower 10, provided so as to cover the side wall 15 and the bottom surface 16 of the reaction tower 10 from outside the reaction tower 10. On the other hand, the second heating tube arrangement 712 is provided so as to cover a side surface of the liquid discharge tube 20 from outside the liquid discharge tube 20. The first heating tube arrangement 711 and the second heating tube arrangement 712 may communicate with each other. It should be noted that the heating unit 700 may have at least one of the first heating tube arrangement 711 and the second heating tube arrangement 712. The pump 720 circulates the geothermal water 713 in the heating tube arrangement 710. The heating unit 700 may heat the exhausted liquid 46 to 70° C. or higher, may heat the exhausted liquid 46 to 80° C. or higher, or may heat the exhausted liquid 46 to 100° C. or higher.

Thus, the heating unit 700 heats at least one of the liquid discharge region 702 in the reaction tower 10 and the liquid discharge tube 20, which then prevents deposition of a fine suspended matter in the exhausted liquid 46, that is, silica, calcium, aluminum, magnesium, and the like. As a result, it is possible to prevent the formation of "scale" and prevent the scale from clogging a flow channel of the exhausted liquid 46. Particularly, when the exhausted liquid 46 is a silica solution, it is possible to reduce formation of silica scale caused by deposition of silica.

The heating unit 700 may include a measurement unit 730 and a geothermal water temperature adjustment unit 722. In an example, the measurement unit 730 may measure an impurity (a suspended matter) concentration or composition in the gas 30, and may measure an impurity (a suspended matter) concentration or composition in the exhausted liquid 46. In an example, the measurement unit 730 may measure a silica concentration in the gas 30, and may measure a silica concentration in the exhausted liquid 46. It should be noted that, for the measurement of concentration or composition in the measurement unit 730, the prior art can be used and therefore detailed description will be omitted.

The geothermal water temperature adjustment unit 722 may change, according to a result of measurement by the measurement unit 730, a temperature at which the exhausted liquid 46 is heated. The geothermal water temperature adjustment unit 722 may adjust, according to the result of measurement by the measurement unit 730, a temperature of the geothermal water 713 by selecting the geothermal water 713 collected at different collection positions. The heating unit 700 may change the heating temperature of the exhausted liquid 46 based on the impurity composition in the gas 30 or in the exhausted liquid. Moreover, the heating unit 700 may change the heating temperature of the exhausted liquid 46 based on the silica concentration in the gas 30 or in the exhausted liquid 46. In an example, the heating temperature may be increased in order to inhibit the deposition of silica since silica is likely to be deposited as the silica concentration is increased. Alternatively, if the composition determines a deposition temperature at which the deposition of the suspended matter is started, the heating temperature may be increased such that the exhausted liquid 46 has a temperature equal to or higher than the deposition temperature. However, the heating unit 700 may have a configuration without measurement unit 730 or geothermal water temperature adjustment unit 722. All surfaces with which the geothermal steam inside the wet-type cyclone scrubber unit 100 is in contact may be coated with the protection material described above. Moreover, all surfaces with which the exhausted liquid 46 is in contact may be coated with the protection material. Coating with the protection material can inhibit the deposition of silica.

Figure 14:
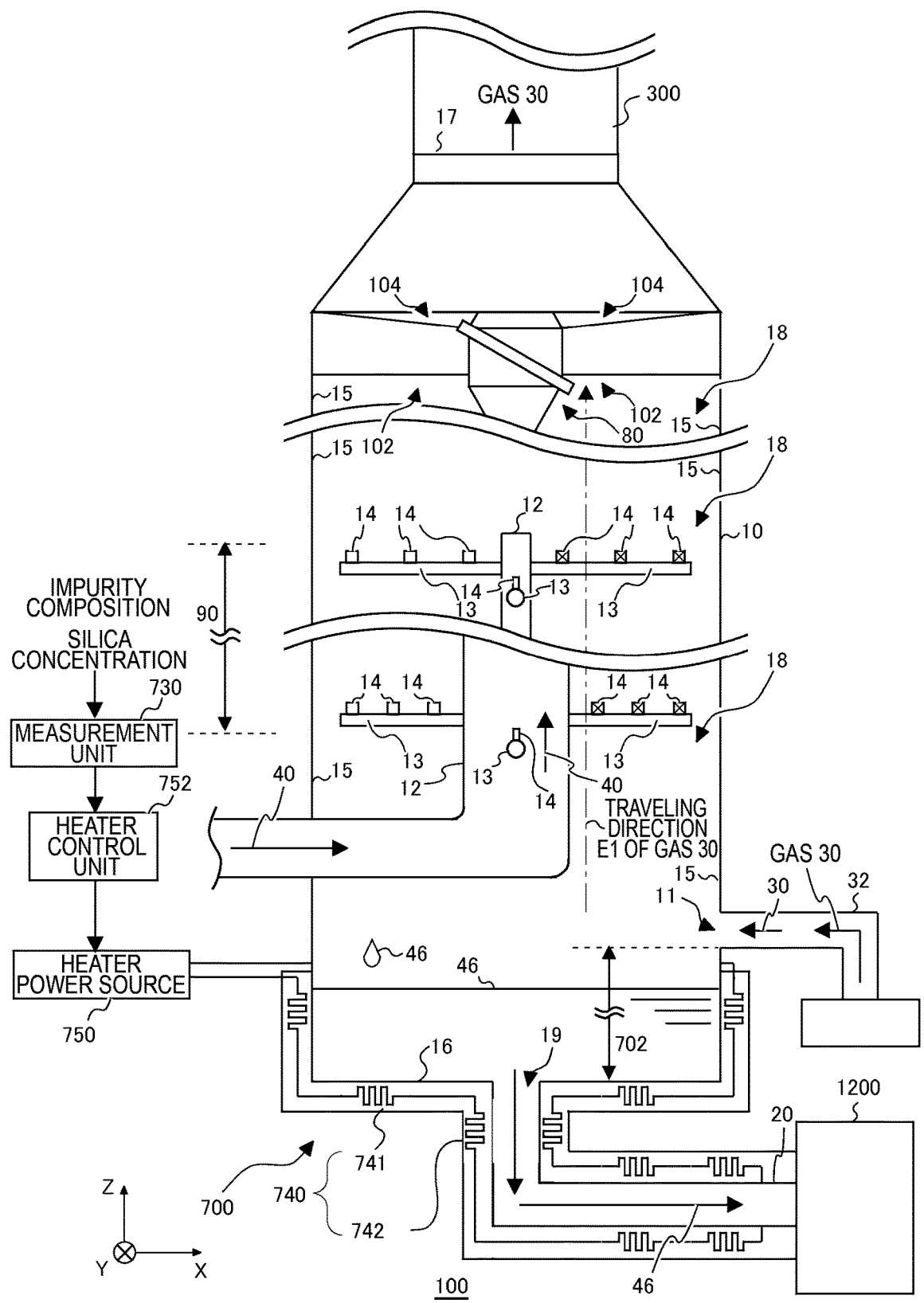
FIG. 14 shows another example of the wet-type cyclone scrubber unit 100 in the scrubber apparatus for geothermal power generation 1000.

FIG. 14 shows another example of the wet-type cyclone scrubber unit 100 in the scrubber apparatus for geothermal power generation 1000. Except for the configuration of the heating unit 700, the wet-type cyclone scrubber unit 100 shown in FIG. 14 has a similar structure to the structure of the wet-type cyclone scrubber unit 100 shown in FIG. 13.

The heating unit 700 shown in FIG. 14 is also provided to at least one of the liquid discharge region 702 and a portion of the liquid discharge tube 20 that is connected farther downstream than the liquid discharge port 19, and heats the exhausted liquid 46. The heating unit 700 in this example is provided to both the liquid discharge region 702 and the liquid discharge tube 20 that is connected farther downstream than the liquid discharge port 19. The heating unit 700 may include the first heating unit for heating the liquid discharge region 702 of the reaction tower 10 and the second heating unit for heating that portion of the liquid discharge tube 20. In this example, the heating unit 700 includes a heater unit 740 and a heater power source 750. The heater unit 740 heats at least parts of the liquid discharge region 702 and of the liquid discharge tube 20, of the wet-type cyclone scrubber unit 100. The heater unit 740 may be an electric heater, or may be an infrared heater. In this example, the heater unit 740 is an electric heater.

The heater unit 740 may include a plurality of heaters. In an example, the heater unit 740 may include a first heater unit 741 and a second heater unit 742. The first heater unit 741 may be, in the liquid discharge region 702 of the reaction tower 10, provided so as to cover the side wall 15 and the bottom surface 16 of the reaction tower 10 from outside the reaction tower 10. On the other hand, the second heater unit 742 is provided so as to cover a side surface of the liquid discharge tube 20 from outside the liquid discharge tube 20. The first heater unit 741 and the second heater unit 742 may be connected in series or in parallel. It should be noted that the heating unit 700 may have at least one of the first heater unit 741 and the second heater unit 742. The heater power source 750 supplies power to the heater unit 740. The first heater unit 741 and the second heater unit 742 are, in an example, electric resistors, a current flowing through which generates Joule heat. In this example as well, the heating unit 700 may heat the exhausted liquid 46 to 70° C. or higher, may heat the exhausted liquid 46 to 80° C. or higher, or may heat the exhausted liquid 46 to 100° C. or higher.

Thus, the heating unit 700 heats at least one of the liquid discharge region 702 in the reaction tower 10 and the liquid discharge tube 20, which can then prevent the deposition of the fine suspended matter in the exhausted liquid 46, that is, silica, calcium, aluminum, magnesium, and the like, to prevent the formation of "scale" and prevent the scale from clogging the flow channel of the exhausted liquid 46. Particularly, when the exhausted liquid is a silica solution, the deposition of silica can be prevented.

The heating unit 700 may include the measurement unit 730 and a heater control unit 752. The measurement unit 730 is similar to the case shown in FIG. 13. The heater control unit 752 may change, according to the result of measurement by the measurement unit 730, the temperature at which the exhausted liquid 46 is heated. The heater control unit 752 may adjust, according to the result of measurement by the measurement unit 730, the heating temperature by adjusting the power supplied from the heater power source 750 to the heater unit 740. As a result, the heating unit 700 may change the heating temperature of the exhausted liquid 46 based on the impurity composition in the gas 30 or in the exhausted liquid. Moreover, the heating unit 700 may change the heating temperature of the exhausted liquid 46 based on the silica concentration in the gas 30 or in the exhausted liquid. The configuration shown in FIG. 14 can also inhibit the deposition of silica caused by a decrease in a temperature of the exhausted liquid.

Figure 15:
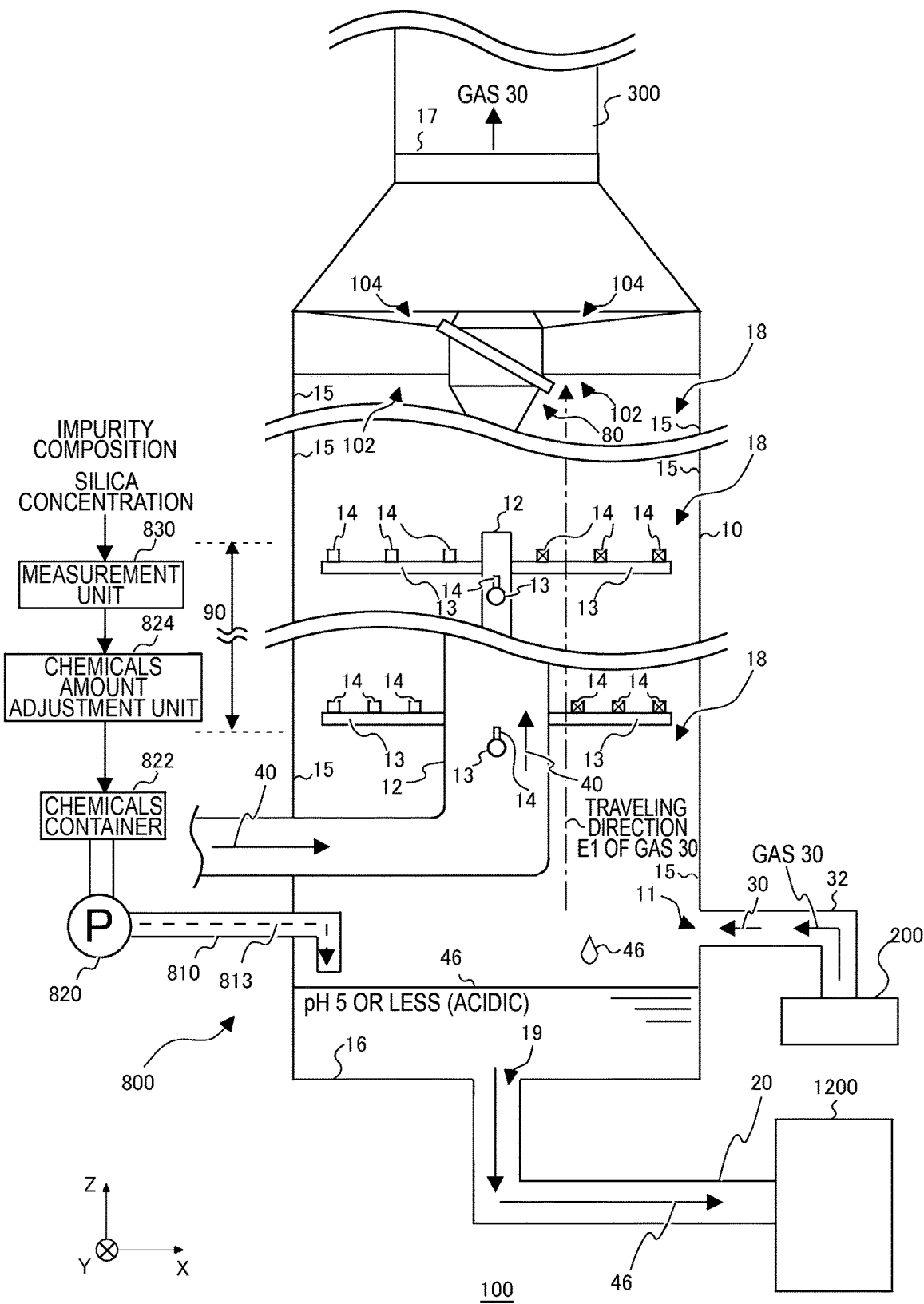
FIG. 15 shows another example of the wet-type cyclone scrubber unit 100 in the scrubber apparatus for geothermal power generation 1000.

FIG. 15 shows another example of the wet-type cyclone scrubber unit 100 in the scrubber apparatus for geothermal power generation 1000. The wet-type cyclone scrubber unit 100 in this example includes a chemicals introduction unit 800 for causing the exhausted liquid 46 to contain chemicals 813. Moreover, in FIG. 15, the heating unit 700 is omitted. Except for these points, this wet-type cyclone scrubber unit 100 has a similar structure to the structures of the wet-type cyclone scrubber unit 100 shown in FIG. 13 and FIG. 14. It should be noted that the wet-type cyclone scrubber unit 100 may include both the chemicals introduction unit 800 and the heating unit 700.

The chemicals introduction unit 800 causes the exhausted liquid 46 to contain the chemicals 813. The chemicals 813 may adjust the exhausted liquid 46 to be acidic. Particularly, the chemicals 813 may adjust a hydrogen-ion exponent (pH) of the exhausted liquid 46 to 5 or less. The chemicals 813 may contain various acids such as HCl used to adjust the hydrogen-ion exponent. In the example shown in FIG. 15, the chemicals introduction unit 800 includes a chemicals introduction tube 810, a pump 820, a chemicals container 822, a chemicals amount adjustment unit 824, and a measurement unit 830.

In this example, an inner surface of the reaction tower 10 may be formed of a material resistant to the chemicals 813. The chemicals introduction tube 810 may penetrate a side surface of the reaction tower 10. The chemicals introduction tube 810 introduces the chemicals 813 into the reaction tower 10. The exhausted liquid 46 accumulated on the bottom surface 16 in the reaction tower 10 is caused to contain the chemicals 813 introduced into the reaction tower 10 via the chemicals introduction tube 810. As a result, the hydrogen-ion exponent of the exhausted liquid 46 is adjusted. The adjusted exhausted liquid passes through the liquid discharge port 19 and the liquid discharge tube 20, to be introduced into the reduction well 1200. It should be noted that the exhausted liquid 46 may be neutralized with a neutralizer before being introduced into the reduction well 1200.

Thus, adjusting the hydrogen-ion exponent of the exhausted liquid 46 can inhibit the formation of "scale" caused by the deposition of the fine suspended matter in the exhausted liquid 46, that is, silica, calcium, aluminum, magnesium and the like. As a result, it is possible to prevent the scale from clogging the flow channel of the exhausted liquid. Particularly, when the exhausted liquid is a silica solution, the deposition of silica can be reduced.

The measurement unit 830 is similar to the measurement unit 730 in FIG. 13. Therefore, repeated description will be omitted. The chemicals amount adjustment unit 824 adjusts the hydrogen-ion exponent (pH) of the exhausted liquid 46 according to a result of measurement by the measurement unit 830. Specifically, the chemicals amount adjustment unit 824 adjusts a concentration or an amount of the chemicals 813 to be mixed into the exhausted liquid 46. In an example, the chemicals 813 whose amount or concentration has been adjusted is temporarily stored in the chemicals container 822. The pump 820 injects the chemicals 813 in the chemicals container 822 into the reaction tower 10 through the chemicals introduction tube 810. As a result, the chemicals introduction unit 800 may change the hydrogen-ion exponent of the exhausted liquid 46 based on the impurity composition in the gas 30 or in the exhausted liquid. Moreover, the chemicals introduction unit 800 may change the hydrogen-ion exponent of the exhausted liquid 46 based on the silica concentration in the gas 30 or in the exhausted liquid. However, the chemicals introduction unit 800 may not have the measurement unit 830 and the chemicals amount adjustment unit 824.

Figure 16:
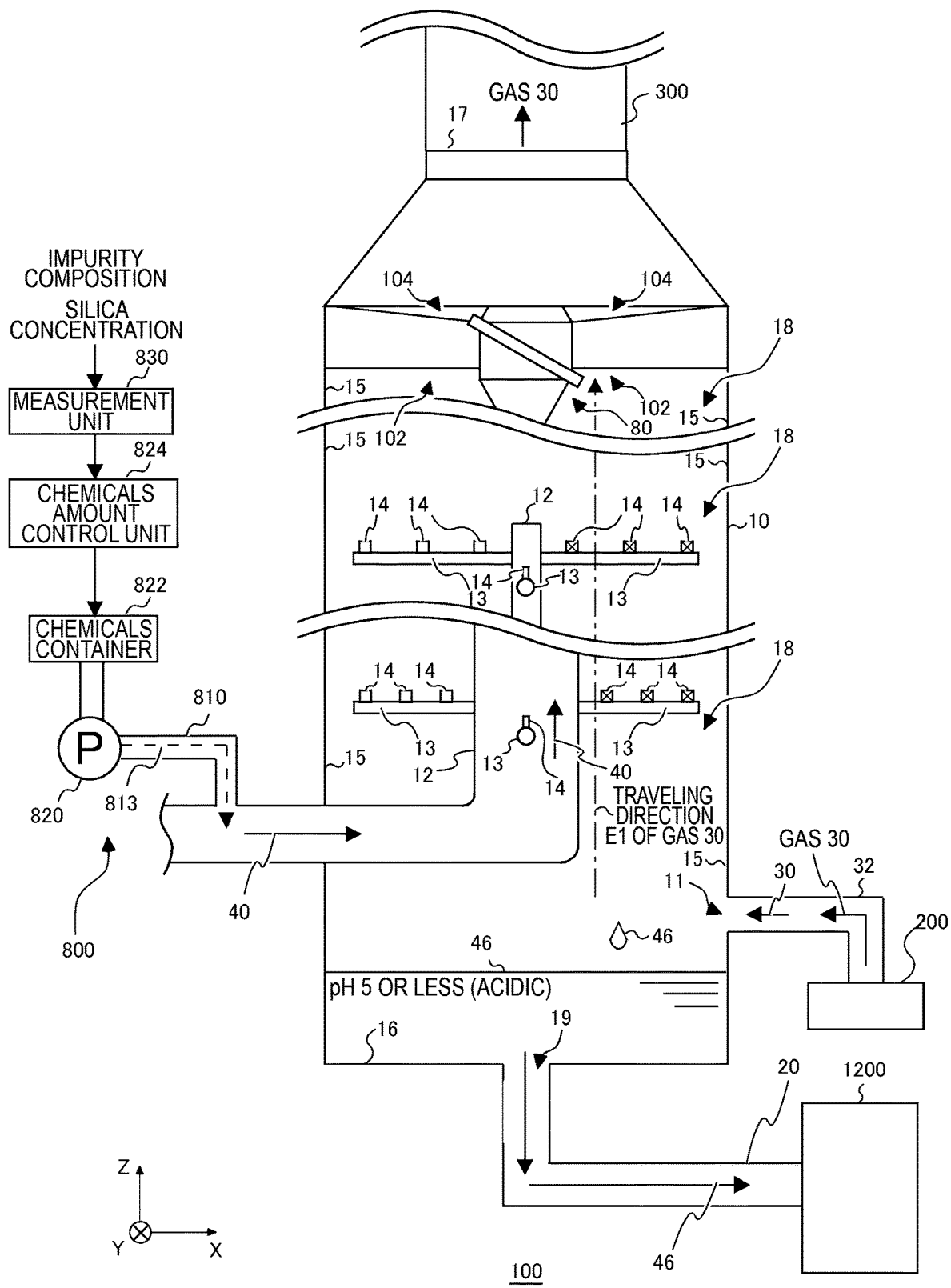
FIG. 16 shows another example of the wet-type cyclone scrubber unit 100 in the scrubber apparatus for geothermal power generation 1000.

FIG. 16 shows another example of the wet-type cyclone scrubber unit 100 in the scrubber apparatus for geothermal power generation 1000. In FIG. 16, the chemicals introduction tube 810 is connected to the trunk tube 12 for introducing the liquid 40 into the reaction tower 10. As a result, the hydrogen-ion exponent of the liquid 40 is adjusted upstream where the liquid 40 is sprayed. As a result, the hydrogen-ion exponent is also adjusted for the exhausted liquid 46 generated by the liquid 40 taking in impurities. Except for that configuration, the wet-type cyclone scrubber unit 100 in the scrubber apparatus shown in FIG. 16 has a similar configuration to the configuration of the wet-type cyclone scrubber unit 100 in the scrubber apparatus shown in FIG. 15. Therefore, detailed description will be omitted.

Figure 17:
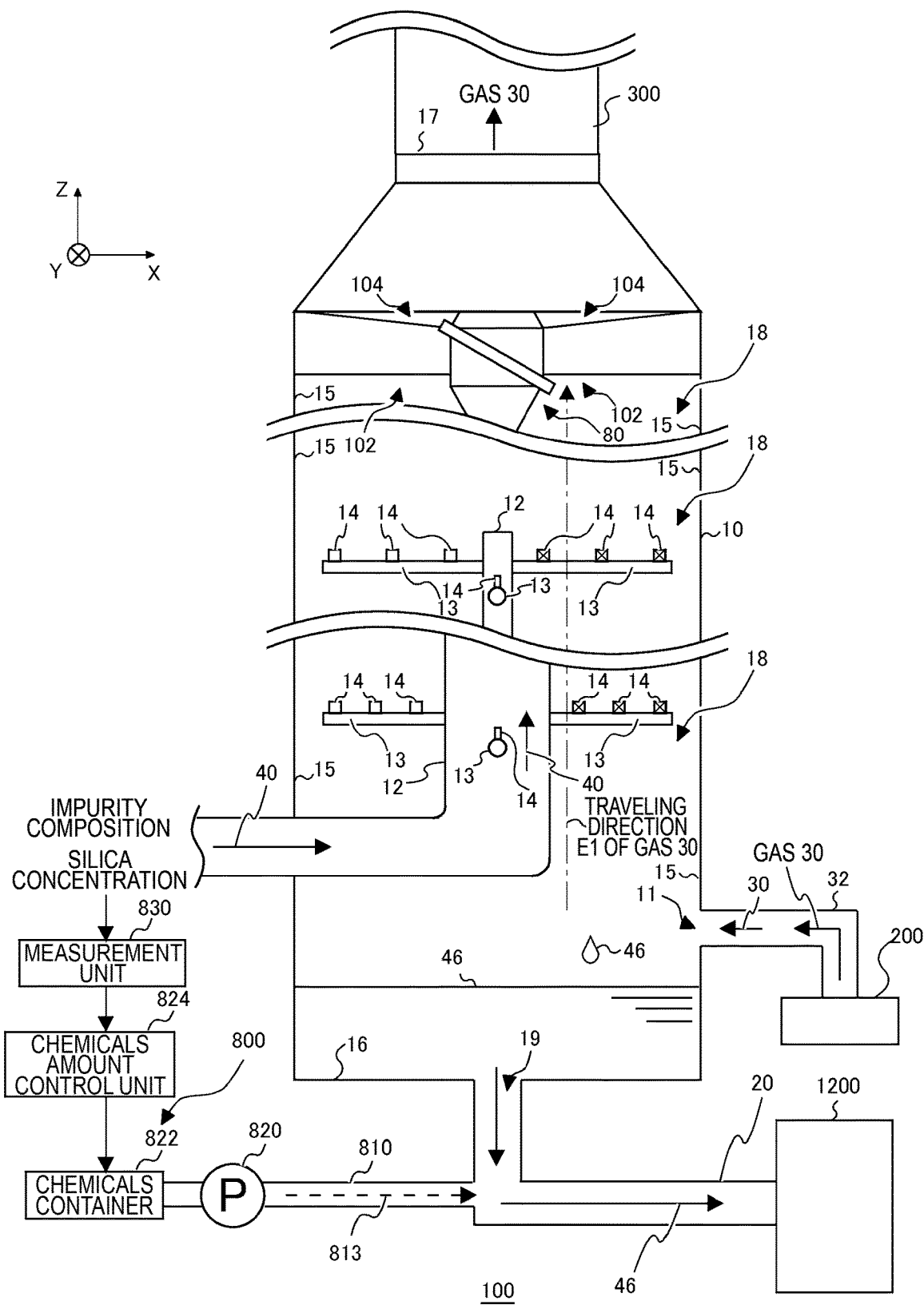
FIG. 17 shows another example of the wet-type cyclone scrubber unit 100 in the scrubber apparatus for geothermal power generation 1000.

FIG. 17 shows another example of the wet-type cyclone scrubber unit 100 in the scrubber apparatus for geothermal power generation 1000. In FIG. 17, the chemicals introduction tube 810 is connected to the liquid discharge tube 20 that is connected farther downstream than the liquid discharge port 19. This can adjust the hydrogen-ion exponent of the exhausted liquid 46, for the exhausted liquid 46 farther downstream than a connecting portion between the chemicals introduction tube 810 and the liquid discharge tube 20. The chemicals introduction tube 810 is desirably connected to the liquid discharge tube 20 near the liquid discharge port 19. In an example, the chemicals introduction tube 810 is desirably connected to the liquid discharge tube 20 in a region within 1 m from the liquid discharge port 19.

The configurations as shown in FIG. 16 and FIG. 17 can also adjust the hydrogen-ion exponent of the exhausted liquid 46. This can inhibit the formation of "scale" caused by the deposition of the fine suspended matter in the exhausted liquid 46, that is, silica, calcium, aluminum, magnesium and the like. As a result, it is possible to prevent the scale from clogging the flow channel of the exhausted liquid. Particularly, when the exhausted liquid is a silica solution, the deposition of silica can be reduced. Moreover, the deposited silica or the like can be removed.

It should be noted that it is possible to combine the treatment by the heating unit 700 shown in FIG. 13 and FIG. 14 and the treatment by the chemicals introduction unit 800 shown in FIG. 15 to FIG. 17. In this case, in an example, the heating unit 700 continuously and constantly heats the exhausted liquid 46 during operation of the geothermal power generation, and the chemicals introduction unit 800 may perform treatment such that the exhausted liquid 46 is caused to temporarily contain the chemicals 813 when the impurity composition or the silica concentration in the gas 30 or in the exhausted liquid 46 satisfies a predetermined condition. As a result, heating treatment can inhibit the formation of scale so as to give minimum damage to to the liquid discharge tube 20 and the inner surface of the reaction tower 10 where the exhausted liquid 46 flows, while chemical treatment can be performed only for the impurity composition or the silica concentration that would cause the formation of scale even with the heating treatment.

Figure 18:
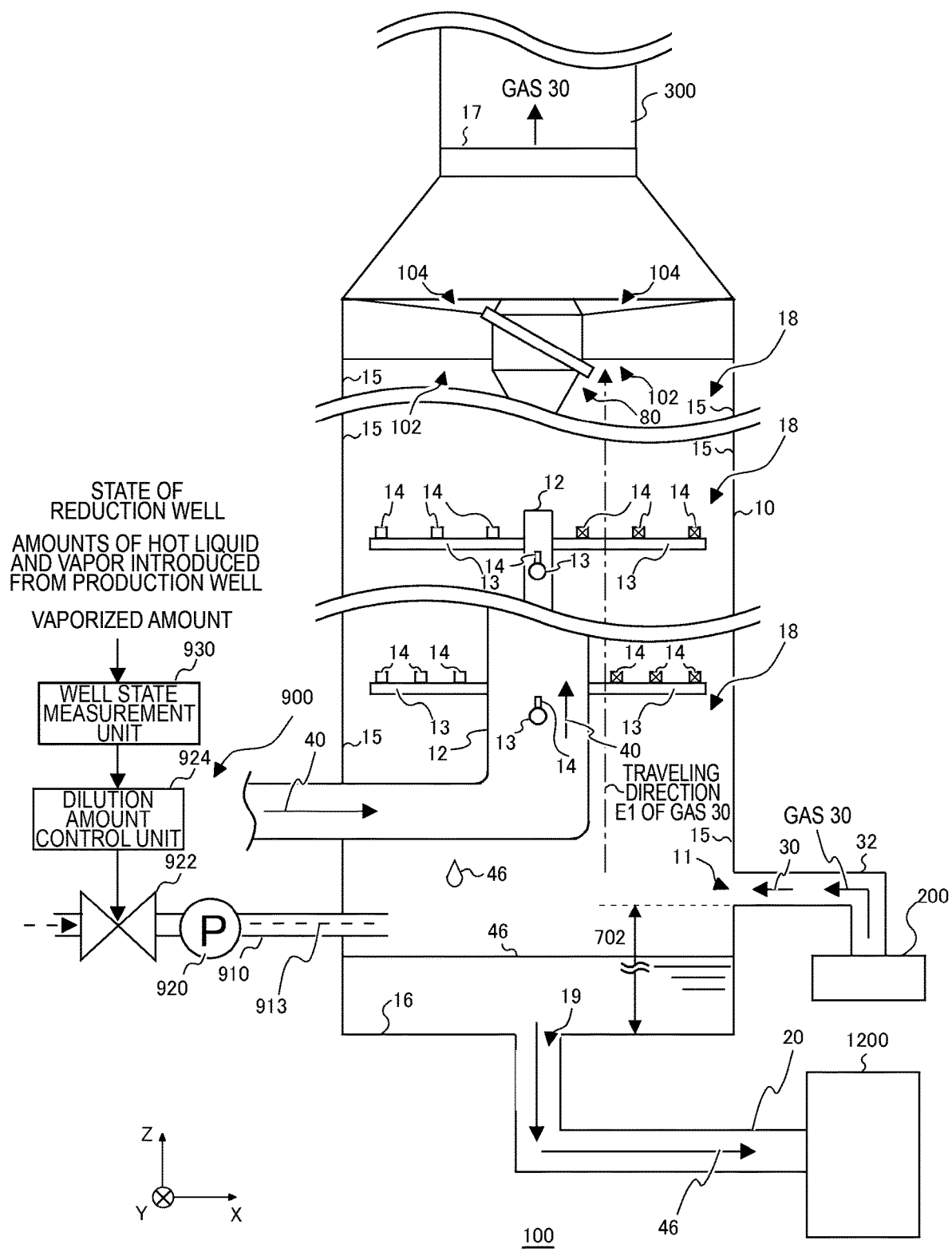
FIG. 18 shows another example of the wet-type cyclone scrubber unit 100 in the scrubber apparatus for geothermal power generation 1000.

FIG. 18 shows another example of the wet-type cyclone scrubber unit 100 in the scrubber apparatus for geothermal power generation 1000. The wet-type cyclone scrubber unit 100 in FIG. 18 includes a dilute solution supply unit 900. Moreover, in FIG. 18, the heating unit 700 and the chemicals introduction unit 800 are omitted. Except for these points, this wet-type cyclone scrubber unit 100 has a similar structure to the structures of the wet-type cyclone scrubber unit 100 shown in FIG. 13 to FIG. 17. It should be noted that the wet-type cyclone scrubber unit 100 may include both the dilute solution supply unit 900 and the heating unit 700. The wet-type cyclone scrubber unit 100 may include both the dilute solution supply unit 900 and the chemicals introduction unit 800.

The dilute solution supply unit 900 shown in FIG. 18 supplies a dilute solution 913 for diluting the exhausted liquid 46. The dilute solution supply unit 900 is provided to at least one of the liquid discharge region 702 in the reaction tower 10 and a portion of the liquid discharge tube 20 that is connected farther downstream than the liquid discharge port 19. The dilute solution 913 may be, for example, water. The dilute solution supply unit 900 may collect river water or the like as the dilute solution 913. In the example shown in FIG. 18, the dilute solution supply unit 900 may include a dilute solution introduction tube 910, a pump 920, an adjustment valve 922, a dilution amount control unit 924, and a well state measurement unit 930.

The dilute solution introduction tube 910 may penetrate the side surface of the reaction tower 10. The dilute solution introduction tube 910 introduces the dilute solution 913 into the reaction tower 10. The dilute solution introduction tube 910 is desirably provided to the liquid discharge region 702 of the reaction tower 10. Introducing the dilute solution 913 into the reaction tower 10 on the gas outlet port 17 side might draw heat from the gas 30 with the dilute solution 913. Therefore, the dilute solution introduction tube 910 is advantageously provided to the liquid discharge region 702 of the reaction tower 10.

The dilute solution 913 introduced into the reaction tower 10 via the dilute solution introduction tube 910 dilutes the exhausted liquid 46 accumulated on the bottom surface 16 in the reaction tower 10. As a result, it is possible to reduce a concentration of impurities in the exhausted liquid 46, such as silica, calcium, aluminum, and magnesium. Therefore, it is possible to inhibit the formation of "scale" caused by the deposition of silica, calcium, aluminum, magnesium, and the like.

The well state measurement unit 930 may measure an amount of liquid (an amount of water) in the reduction well 1200 for returning the gas 30 used for the geothermal power generation to a liquid and returning the liquid to the underground geothermal reservoir. Alternatively or additionally, the well state measurement unit 930 may measure amounts of the vapor 1110 and the hot liquid 1120 pumped from the geothermal reservoir in the production well 1100.

The dilution amount control unit 924 adjusts, based on a result of measurement by the well state measurement unit 930, an amount of the dilute solution 913 to be supplied. Specifically, the dilution amount control unit 924 may adjust opening of the adjustment valve 922. The adjustment valve 922 adjusts, according to the opening, the amount of the dilute solution 913 to be supplied. This allows the dilute solution supply unit 900 to adjust, based on the amount of water in the reduction well 1200, the amount of the dilute solution to be supplied. If the amount of water in the reduction well 1200 is small, the dilute solution supply unit 900 may increase the amount of the dilute solution 913 to be supplied. With such adjustment, adjustment can be made such that the liquid does not overflow in the reduction well 1200.

Figure 19:
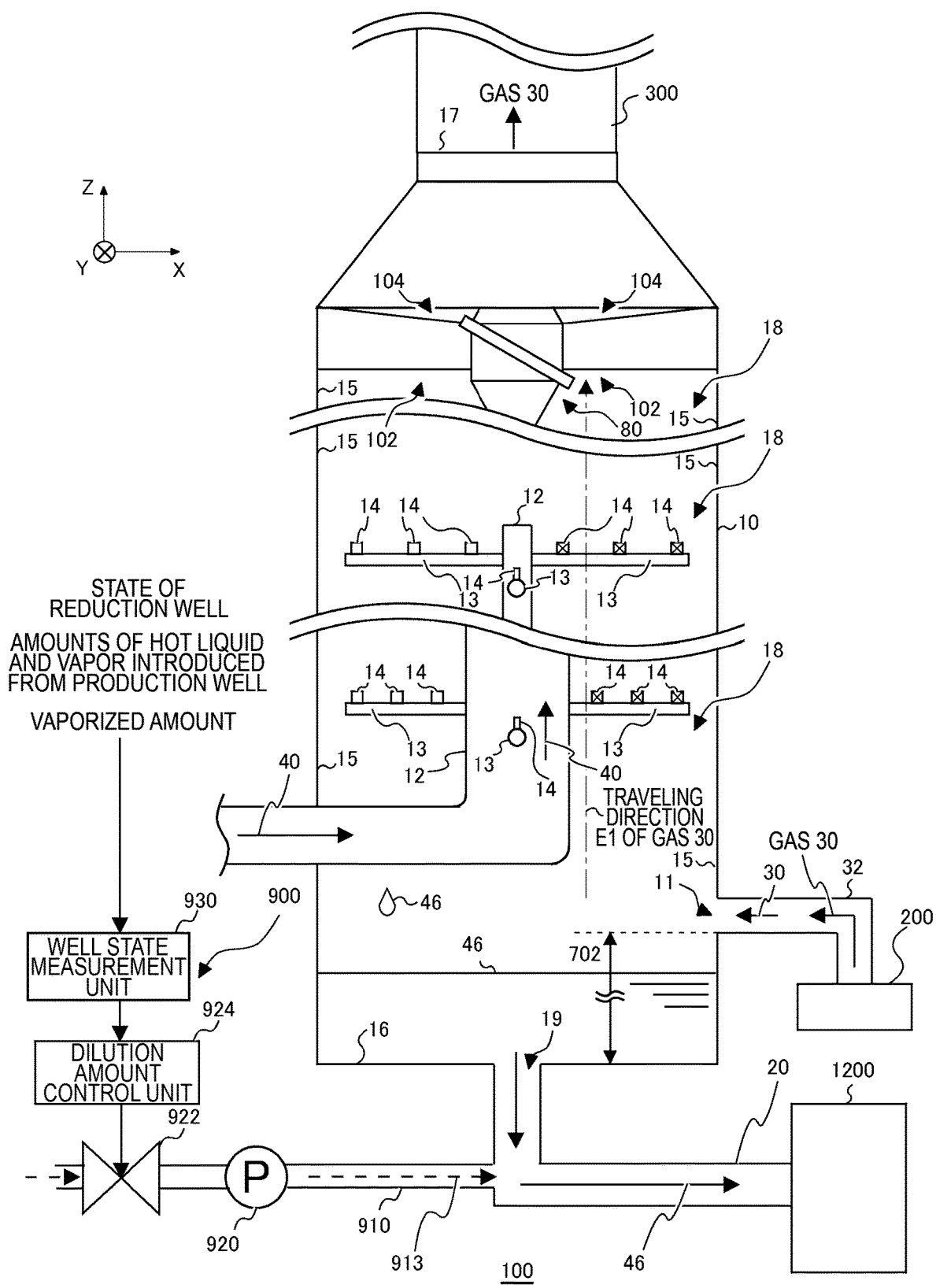
FIG. 19 shows another example of the wet-type cyclone scrubber unit 100 in the scrubber apparatus for geothermal power generation 1000.

FIG. 19 shows another example of the wet-type cyclone scrubber unit 100 in the scrubber apparatus for geothermal power generation 1000. In FIG. 19, the dilute solution introduction tube 910 is connected to the liquid discharge tube 20 that is connected farther downstream than the liquid discharge port 19. This can reduce the concentration of silica or the like in the exhausted liquid 46, for the exhausted liquid 46 farther downstream than a connecting portion between the dilute solution introduction tube 910 and the liquid discharge tube 20. The dilute solution introduction tube 910 is desirably connected to the liquid discharge tube 20 near the liquid discharge port 19. For example, the dilute solution introduction tube 910 is desirably connected to the liquid discharge tube 20 in a region within 1 m from the liquid discharge port 19. This can inhibit the formation of "scale" caused by the deposition of silica, calcium, aluminum, magnesium, and the like.

Figure 20:
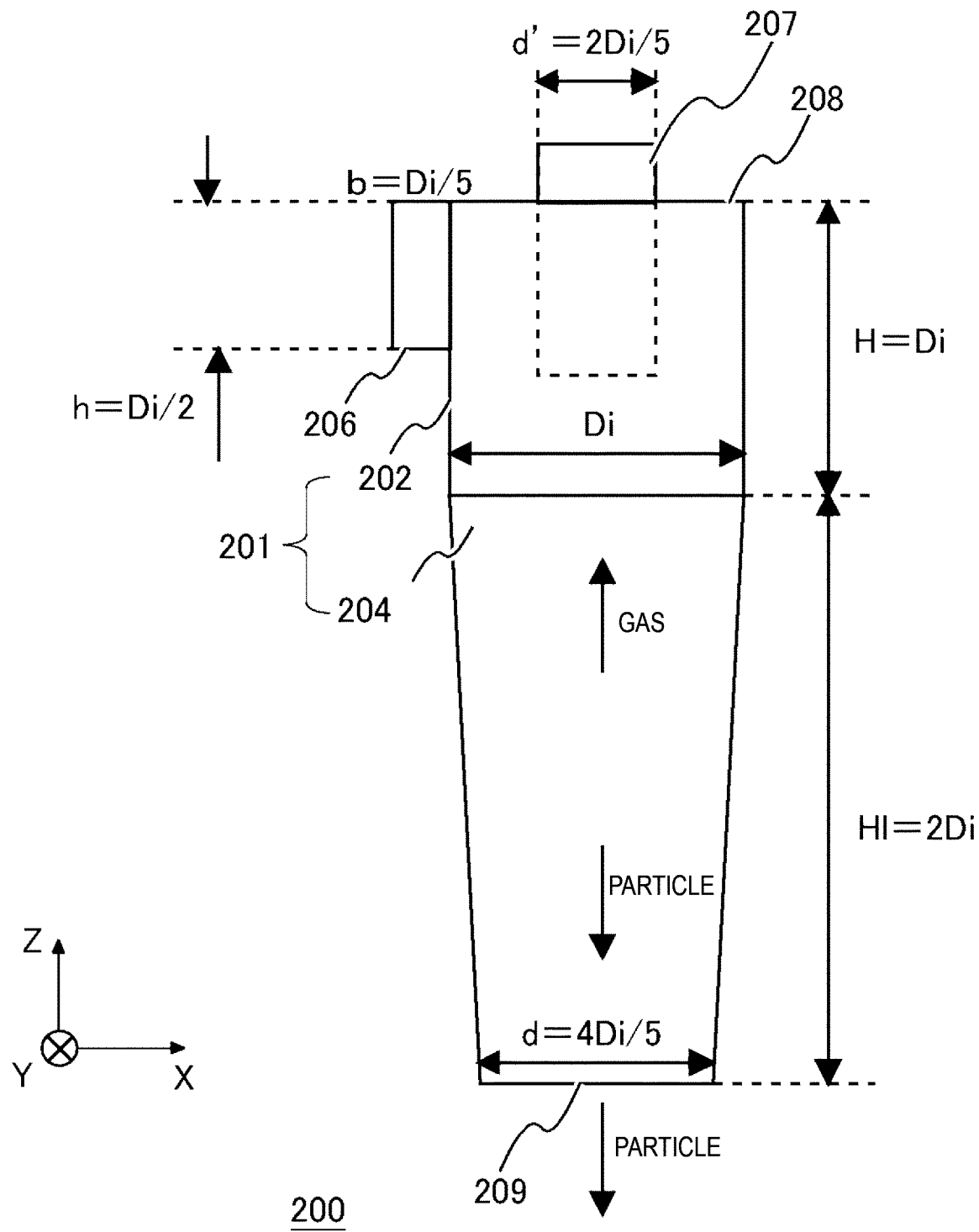
FIG. 20 shows an example of a dry-type cyclone scrubber unit 200.

FIG. 20 shows an example of a dry-type cyclone scrubber unit 200. The dry-type cyclone scrubber unit 200 has a tube body 201. The tube body 201 has a cylindrical portion 202 and a conical portion 204 communicating with each other at their ends. A diameter of the conical portion 204 changes so as to be reduced in the Z-axis direction from one end toward the other end. An inlet 206 is provided to a side surface of the cylindrical portion 202. The gas 30 is introduced via the inlet 206. One end of the cylindrical portion 202 and one end of the conical portion 204 communicate with each other. The other end of the conical portion 204 is a dust discharge port 209. The other end of the cylindrical portion 202 is provided with a divider 208 for dividing an internal space of the dry-type cyclone scrubber unit 200 and an outside. The center of the divider 208 is provided with a gas outflow port 207 connecting the internal space of the dry-type cyclone scrubber unit 200 and the outside. The gas 30 is introduced via the gas outflow port 207.

An outer cylindrical diameter of the cylindrical portion 202 is defined as Di. A height H of the cylindrical portion 202 is Di, and a height H1 of the conical portion 204 is 2Di. A height in the Z-axis direction of the inlet 206 is Di/2. A width b in the Y direction of the inlet 206 is Di/5. A diameter d' of the gas outflow port 207 is 2Di/5. A diameter d of the dust discharge port 209 is 4Di/5. In this case, viscosity of the gas 30 is defined as $\mu$(kg/m s), dust density as $\rho$(kg/m), gas velocity of the inlet 206 as u(m/s), dust particle density as $\rho_p$(kg/m). In this case, a limit minimum radius $D_{pmin}$ of separable particles in the dry-type cyclone scrubber unit 200 is a square root of $(\mu b/\{\mu u(\rho_p-\rho)\})$. For example, assuming Di=0.8 m, the limit minimum radius $D_{pmin}$ is about 7 $\mu$m. That is, in an example, a suspended matter (silica or the like) having a size of of 7 $\mu$m or more can be removed by the dry-type cyclone scrubber unit 200. The limit minimum radius $D_{pmin}$ of the separable particles is reduced as the outer cylindrical diameter Di is reduced. As described above, in the dry-type cyclone scrubber unit 200, the relatively large suspended matter can be removed among the particulate dusts in the gas 30. Since an amount of gas that can be treated is reduced as the outer cylindrical diameter Di is smaller, it is also possible to secure the amount of gas that can be treated, by reducing the outer cylindrical diameter Di to install a plurality of the cylindrical portion 202 in parallel while the fine suspended matter can be removed.

Figure 21:
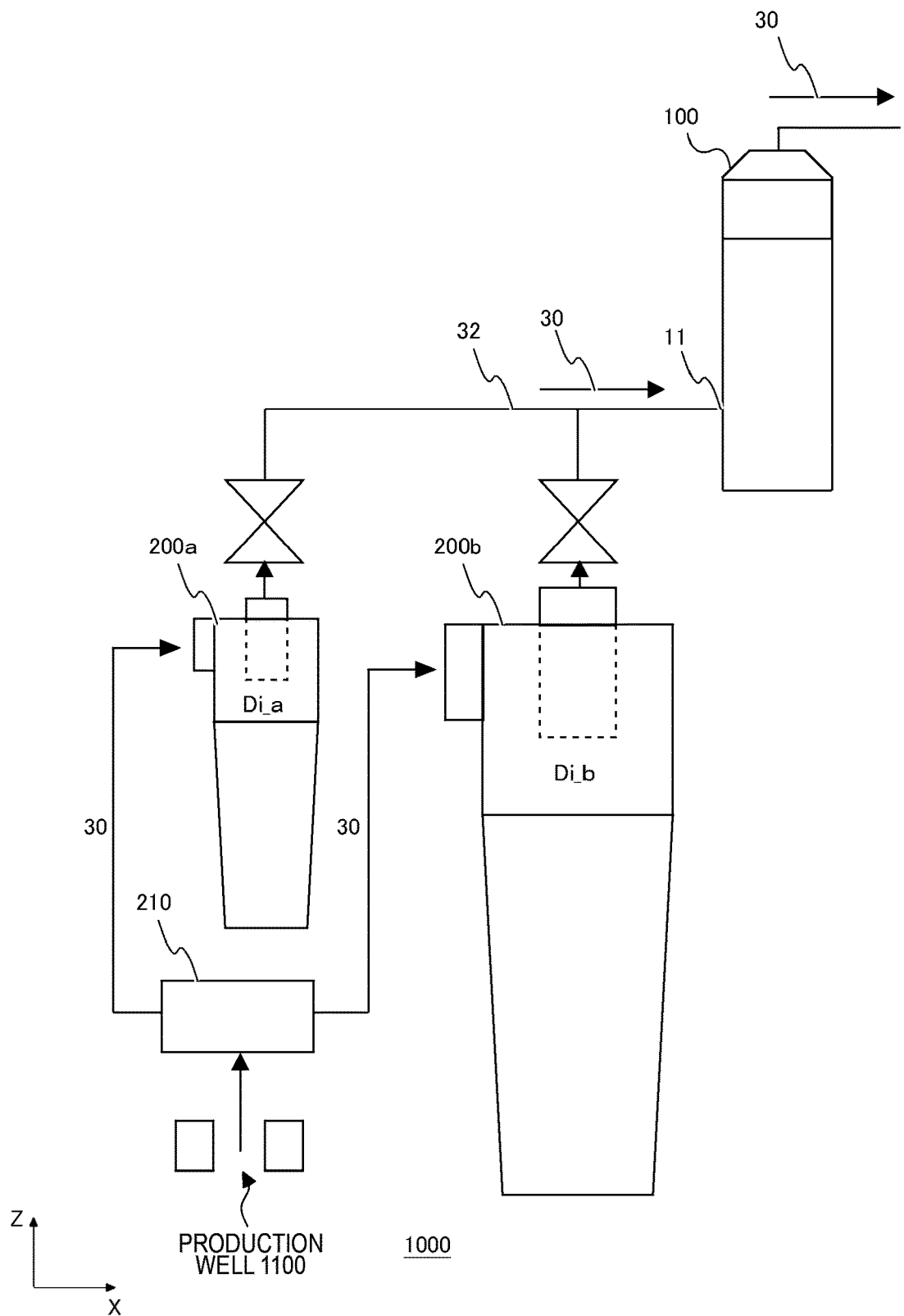
FIG. 21 shows another example of the scrubber apparatus for geothermal power generation 1000.

FIG. 21 shows another example of the scrubber apparatus for geothermal power generation 1000. In the example shown in FIG. 21, the scrubber apparatus for geothermal power generation 1000 includes a plurality of dry-type cyclone scrubber units 200a and 200b with different tube body diameters Di. Specifically, a diameter Di_a for the first dry-type cyclone scrubber unit 200a is smaller than a diameter Di_b for the second dry-type cyclone scrubber unit 200b. Therefore, a limit minimum radius $D_{pmin}$ for the first dry-type cyclone scrubber unit 200a is smaller than a limit minimum radius $D_{pmin}$ for the second dry-type cyclone scrubber unit 200a. The scrubber apparatus for geothermal power generation 1000 in this example includes a switching unit 210 for selecting, between the plurality of dry-type cyclone scrubber units 200a and 200b, a dry-type cyclone scrubber unit 200 to supply gas to the gas inlet port 11 of the wet-type cyclone scrubber unit 100. The switching unit 210 is a switching valve in an example. The switching unit 210 can select an appropriate dry-type cyclone scrubber unit 200 according to a size of a fine particle contained in the gas.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A scrubber apparatus for geothermal power generation configured to treat gas from geothermal power generation equipment to supply a power generation apparatus with the treated gas, the scrubber apparatus for geothermal power generation comprising:
    a wet-type cyclone scrubber unit that has a reaction tower into which the gas is introduced and a liquid spray unit for spraying liquid into the reaction tower and that is configured to treat the gas with the liquid;
    a gas derivation unit connected to the wet-type cyclone scrubber unit and configured to derive the gas to the power generation apparatus;
    a swirling unit that is arranged farther downstream than the liquid spray unit in a gas flow channel including the wet-type cyclone scrubber unit and the gas derivation unit and that is configured to swirl the gas in a predetermined swirling direction; and
    a plurality of ejection units located in the liquid spray unit, wherein the plurality of ejection units eject liquid into the reaction tower in opposite directions to promote swirling in the liquid spray unit, and
    wherein the gas travels downstream inside the reaction tower while swirling in the liquid spray unit in the predetermined swirling direction.

2. The scrubber apparatus for geothermal power generation according to claim 1, wherein
    the swirling unit is provided inside the reaction tower.

3. The scrubber apparatus for geothermal power generation according to claim 1, wherein
    the swirling unit is provided to the gas derivation unit.

4. The scrubber apparatus for geothermal power generation according to claim 3, wherein
    the power generation apparatus has a turbine, and
    an axis of the swirling unit and a rotational axis of the turbine are coaxially provided.

5. The scrubber apparatus for geothermal power generation according to claim 1, further comprising a liquid recovery unit that is provided farther downstream in a traveling direction of the gas than the swirling unit and that is configured to recover liquid having treated the gas.

6. The scrubber apparatus for geothermal power generation according to claim 5, wherein
    an inner wall of the liquid recovery unit is coated with a protection material having a weaker hydrogen bonding force or a weaker electrical attraction force than a material forming the gas derivation unit.

7. The scrubber apparatus for geothermal power generation according to claim 5, wherein
    an outer wall of the liquid recovery unit is coated with a protection material having a weaker hydrogen bonding force or a weaker electrical attraction force than a material forming the gas derivation unit.

8. The scrubber apparatus for geothermal power generation according to claim 5, wherein
the liquid recovery unit is formed of a protection material having a weaker hydrogen bonding force or a weaker electrical attraction force than a material forming the gas derivation unit.

9. The scrubber apparatus for geothermal power generation according to claim 8, further comprising an opening for connecting an inside of the liquid recovery unit and the reaction tower or the gas derivation unit, wherein
the opening is coated with the protection material.

10. The scrubber apparatus for geothermal power generation according to claim 8, wherein
the liquid spray unit is formed of the protection material.

11. The scrubber apparatus for geothermal power generation according to claim 8, wherein
an inner portion of an ejection unit of the liquid spray unit is coated with the protection material.

12. The scrubber apparatus for geothermal power generation according to claim 8, wherein
a vane of the swirling unit is coated with the protection material.

13. The scrubber apparatus for geothermal power generation according to claim 8, wherein
a vane of the swirling unit is coated with the protection material only on an upstream side in a traveling direction of the gas.

14. The scrubber apparatus for geothermal power generation according to claim 8, wherein
the protection material is carbon-based coating such as fluororesin, vinyl chloride, polyethylene, polypropylene, engineering plastic, or DLC (diamond-like carbon).

15. The scrubber apparatus for geothermal power generation according to claim 1, wherein
the power generation apparatus has a turbine, and
the scrubber apparatus for geothermal power generation further comprises a gas recovery unit that is provided farther downstream in a traveling direction of the gas than the turbine and that is configured to recover the gas.

16. The scrubber apparatus for geothermal power generation according to claim 15, wherein
the gas recovery unit is configured to cool vapor of the gas to recover liquid.

17. The scrubber apparatus for geothermal power generation according to claim 15, wherein
the gas recovery unit is configured to recover condensed water from a vicinity of the turbine.

18. The scrubber apparatus for geothermal power generation according to claim 1, further comprising:
a plurality of dry-type cyclone scrubber units with different tube body diameters; and
a switching unit configured to select, among the plurality of dry-type cyclone scrubber units, a dry-type cyclone scrubber unit for supplying the gas to a gas inlet port of the wet-type cyclone scrubber unit.

19. The scrubber apparatus for geothermal power generation according to claim 1, wherein the gas is geothermal steam and the wet-type cyclone scrubber unit is configured to treat the geothermal steam.

20. A scrubber apparatus for geothermal power generation configured to treat gas from geothermal power generation equipment to supply a power generation apparatus with the treated gas, the scrubber apparatus for geothermal power generation comprising:
a wet-type cyclone scrubber unit that has a reaction tower into which the gas is introduced and a liquid spray unit for spraying liquid into the reaction tower and that is configured to treat the gas with the liquid;
a gas derivation unit connected to the wet-type cyclone scrubber unit and configured to derive the gas to the power generation apparatus;
a swirling unit that is arranged farther downstream than the liquid spray unit in a gas flow channel including the wet-type cyclone scrubber unit and the gas derivation unit and that is configured to swirl the gas in a predetermined swirling direction; and
a dry-type cyclone scrubber unit for treating the gas, wherein
the gas travels in order from the dry-type cyclone scrubber unit to the wet-type cyclone scrubber unit.

21. The scrubber apparatus for geothermal power generation according to claim 20, wherein
the swirling unit is provided inside the reaction tower.

22. The scrubber apparatus for geothermal power generation according to claim 20, wherein the gas travels downstream inside the reaction tower while swirling in the liquid spray unit in the predetermined swirling direction.

* * * * *